(12) United States Patent
Comrie

(10) Patent No.: US 8,246,727 B2
(45) Date of Patent: Aug. 21, 2012

(54) METHODS AND DEVICES FOR REDUCING HAZARDOUS AIR POLLUTANTS

(75) Inventor: Douglas C. Comrie, Port Clinton, OH (US)

(73) Assignee: C-Quest Technologies, L.L.C., Cape Coral, FL (US)

( * ) Notice: Subject to any disclaimer, the term of this patent is extended or adjusted under 35 U.S.C. 154(b) by 0 days.

(21) Appl. No.: 13/174,492

(22) Filed: Jun. 30, 2011

(65) Prior Publication Data

US 2011/0256029 A1   Oct. 20, 2011

Related U.S. Application Data

(62) Division of application No. 12/233,144, filed on Sep. 18, 2008, now Pat. No. 7,993,616.

(60) Provisional application No. 60/973,632, filed on Sep. 19, 2007.

(51) Int. Cl.
*B01D 53/14* (2006.01)
*B01D 53/18* (2006.01)
*B01J 20/04* (2006.01)
*B01J 20/10* (2006.01)

(52) U.S. Cl. ............... 96/121; 96/108; 96/123; 96/131; 96/133; 96/138; 96/150; 96/151; 502/407; 502/415

(58) Field of Classification Search ............ 96/121, 96/123, 131, 133, 138, 150, 151; 502/407, 502/445; 95/129, 137; 423/244.07, 242.1, 423/244.01

See application file for complete search history.

(56) References Cited

U.S. PATENT DOCUMENTS

| 4,058,587 A | 11/1977 | Nelson |
| 4,091,076 A | 5/1978 | Vogel et al. |
| 4,124,404 A | 11/1978 | Suzuki et al. |
| 4,179,490 A | 12/1979 | Judd |
| 4,208,384 A | 6/1980 | Mitchell |
| 4,452,766 A | 6/1984 | Pike |
| 4,718,361 A | 1/1988 | Berry |
| 4,888,160 A | 12/1989 | Kosin et al. |

(Continued)

FOREIGN PATENT DOCUMENTS

AR   068502   11/2009

(Continued)

OTHER PUBLICATIONS

Amin, M.S. et al., "Hydration characteristics of hydrothermal treated cement kiln dust-sludge-silica fume pastes," Construction and Building Materials, vol. 25, No. 4, pp. 1870-1876 (Apr. 1, 2011) (published online Dec. 8, 2010).

(Continued)

*Primary Examiner* — Roy King
*Assistant Examiner* — Jared Wood
(74) *Attorney, Agent, or Firm* — Harness, Dickey & Pierce, PLC

(57) ABSTRACT

The disclosure provides methods and systems for sequestering and/or reducing sulfur oxides, nitrogen oxides and/or carbon dioxide present in industrial effluent fluid streams. A solid particulate material comprising a slag component, a binder component (distinct from the slag component), and optionally water is formed and then contacted with the effluent fluid stream to reduce at least one of the sulfur oxides, nitrogen oxides, and/or carbon dioxide. The contacting of the effluent stream may occur in a packed bed reactor with the solid dry particulate material. Methods of reducing pollutants from exhaust generated by combustion sources, lime and/or cement kilns, iron and/or steel furnaces, and the like are provided.

25 Claims, 5 Drawing Sheets

U.S. PATENT DOCUMENTS

| | | | |
|---|---|---|---|
| 4,917,732 A | 4/1990 | Baker | |
| 5,455,013 A | 10/1995 | Shibata et al. | |
| 5,520,894 A | 5/1996 | Heesink et al. | |
| 5,665,319 A | 9/1997 | Hirama et al. | |
| 5,670,122 A | 9/1997 | Zamansky et al. | |
| 5,690,729 A | 11/1997 | Jones, Jr. | |
| 5,695,733 A | 12/1997 | Kroc et al. | |
| 5,895,634 A | 4/1999 | Mitsuoka et al. | |
| 5,925,326 A | 7/1999 | Kapoor et al. | |
| 5,939,036 A | 8/1999 | Porter et al. | |
| 5,997,629 A | 12/1999 | Hills | |
| 6,132,696 A | 10/2000 | Porter et al. | |
| 6,174,506 B1 | 1/2001 | Chakravarti et al. | |
| 6,187,277 B1 | 2/2001 | Kirschner | |
| 6,306,357 B1 | 10/2001 | Simonson et al. | |
| 6,387,337 B1 | 5/2002 | Pennline et al. | |
| 6,485,697 B1 | 11/2002 | Chao | |
| 6,506,349 B1 | 1/2003 | Khanmamedov | |
| 6,596,248 B2 | 7/2003 | Schimkat et al. | |
| 6,645,446 B1 | 11/2003 | Won et al. | |
| 6,890,497 B2 | 5/2005 | Rau et al. | |
| 6,946,014 B2 | 9/2005 | Poupardin et al. | |
| 7,036,304 B2 | 5/2006 | Sakai | |
| 7,906,086 B2 | 3/2011 | Comrie | |
| 7,993,616 B2 | 8/2011 | Comrie | |
| 8,105,558 B2 | 1/2012 | Comrie | |
| 2001/0054253 A1 | 12/2001 | Takahashi et al. | |
| 2003/0157008 A1 | 8/2003 | Pahlman et al. | |
| 2004/0109801 A1 | 6/2004 | Otsuka et al. | |
| 2004/0129181 A1 | 7/2004 | Lalande et al. | |
| 2004/0200393 A1 | 10/2004 | Zauderer | |
| 2004/0265199 A1 | 12/2004 | MacKnight | |
| 2005/0031515 A1 | 2/2005 | Charette | |
| 2005/0132883 A1 | 6/2005 | Su et al. | |
| 2006/0185560 A1 | 8/2006 | Ramme et al. | |
| 2007/0006778 A1 | 1/2007 | Kehrmann | |
| 2007/0154380 A1 | 7/2007 | Takahashi et al. | |
| 2007/0184394 A1 | 8/2007 | Comrie | |
| 2009/0001020 A1 | 1/2009 | Constantz et al. | |
| 2009/0020044 A1 | 1/2009 | Constantz et al. | |
| 2009/0169452 A1 | 7/2009 | Constantz et al. | |
| 2009/0301352 A1 | 12/2009 | Constantz et al. | |
| 2010/0000444 A1 | 1/2010 | Constantz et al. | |
| 2010/0006450 A1 | 1/2010 | Whitehead et al. | |
| 2010/0024686 A1 | 2/2010 | Constantz et al. | |
| 2010/0063902 A1 | 3/2010 | Constantz et al. | |
| 2010/0077922 A1 | 4/2010 | Constantz et al. | |
| 2010/0084280 A1 | 4/2010 | Gilliam et al. | |
| 2010/0132556 A1 | 6/2010 | Constantz et al. | |
| 2010/0135865 A1 | 6/2010 | Constantz et al. | |
| 2010/0135882 A1 | 6/2010 | Constantz et al. | |
| 2010/0140103 A1 | 6/2010 | Gilliam et al. | |
| 2010/0144521 A1 | 6/2010 | Constantz et al. | |
| 2010/0154679 A1 | 6/2010 | Constantz et al. | |
| 2010/0158786 A1 | 6/2010 | Constantz et al. | |

FOREIGN PATENT DOCUMENTS

| | | | |
|---|---|---|---|
| AU | 2007225296 | | 9/2007 |
| AU | 2008302185 | | 3/2009 |
| BR | PI0708702 | | 6/2011 |
| CA | 2646462 | | 9/2007 |
| CA | 2700189 | A1 | 3/2009 |
| CN | 101400430 | | 4/2009 |
| CN | 101828074 | | 9/2010 |
| EP | 1741682 | | 1/2007 |
| EP | 2001577 | | 12/2008 |
| EP | 2203681 | | 7/2010 |
| JP | 52-050985 | | 4/1977 |
| JP | 52050985 | A * | 4/1977 |
| JP | 1284324 | | 11/1989 |
| JP | 05-154349 | | 6/1993 |
| JP | 10-009510 | | 1/1998 |
| JP | 10-249153 | | 9/1998 |
| JP | 11-216332 | | 8/1999 |
| JP | 2006-305566 | | 11/2006 |
| JP | 2009529408 | | 8/2009 |
| RU | 2095436 | | 11/1997 |
| RU | 2250129 | | 4/2005 |
| RU | 2261846 | | 10/2005 |
| RU | 2008140176 | | 4/2010 |
| SU | 1301801 | | 4/1987 |
| TW | 200918153 | | 5/2009 |
| WO | WO 93/20013 | | 10/1993 |
| WO | WO 01/34294 | | 5/2001 |
| WO | WO 2005/015085 | | 2/2005 |
| WO | WO 2005/108297 | | 11/2005 |
| WO | WO 2006/099611 | | 9/2006 |
| WO | WO 2007/106372 | | 3/2007 |
| WO | WO 2007/108719 | | 9/2007 |
| WO | WO 2008/148055 | | 12/2008 |
| WO | WO 2009/006295 | | 1/2009 |
| WO | WO 2009/039393 | | 3/2009 |
| WO | WO 2009/086460 | | 7/2009 |
| WO | WO 2009/146436 | | 12/2009 |
| WO | WO 2009/155378 | | 12/2009 |
| WO | WO 2010/006242 | | 1/2010 |
| WO | WO 2010/008896 | | 1/2010 |
| WO | WO 2010/009273 | | 1/2010 |
| WO | WO 2010/030826 | | 3/2010 |
| WO | WO 2010/039909 | | 4/2010 |
| WO | WO 2010/074686 | | 7/2010 |
| WO | WO 2010/087823 | | 8/2010 |

OTHER PUBLICATIONS

Beach, Debbie et al., "Carbon Sequestration in Waste Mineral Byproducts," Presentation from the Fourth Annual Conference on Carbon Capture & Sequestration, Alexandria, Virgina (May 2-5, 2005).

Bertos et al., "A review of accelerated carbonation technology in the treatment of cement-based materials and sequestration of $CO_2$," Journal of Hazardous Materials, B112, pp. 193-205 (2004).

Chernov, N.N. et al., "The Optimum Composition of Blast-Furnace Slag at the Southern Plants," Mettalurg, No. 4, pp. 6-8 (Apr. 1961).

Chizmeshya et al., HCAPLUS Chem. Abstract for "$CO_2$ Mineral Carbonation Processes in Olivine Feedstock: Insights from the Atomic Scale Simulation," from Proceedings of the International Technical Conference on Coal Utilization and Fuel Systems (2004), 29th, vol. 1, pp. 59-70 (abstract only).

Fauth et al, "Carbon Storage and Sequestration as Mineral Carbonates," Chapter 8 of Environmental Challenges and Greenhouse Gas Control for Fossil Fuel Utilization in the 21st Century, (2002), M. Mercedes Maroto-Valer et al. Eds.

Fauth et al., HCAPLUS Chem. Abstract for "Preprints of Symposia—American Chemical Society, Division of Fuel Chemistry," (2001), vol. 46, No. 1, pp. 278-279 (abstract only).

Huntzinger, Deborah N., "Carbon Dioxide Sequestration in Cement Kiln Dust Through Mineral Carbonation," Doctor of Philosophy Dissertation for Geological Engineering at Michigan Technological University (2007).

Ityokumbul et al., "Reactor Design Considerations in Mineral Sequestration of Carbon Dioxide," from the Proceedings Annual International Pittsburgh Coal Conference (2001), pp. 843-852.

Johnson et al., "Solidification of Stainless Steel Slag by Accelerated Carbonation," Environmental Technology, vol. 24, pp. 671-678 (2003).

Peethamparan, Sulapha et al., "Influence of chemical and physical characteristics of cement kiln dusts (CKDs) on their hydration behavior and potential suitability for soil stabilization," Cement and Concrete Research, vol. 38, No. 6, pp. 803-815 (Jun. 1, 2008).

Siddique, Rafat, "Utilization of cement kiln dust (CKD) in cement mortar and concrete—an overview," Resources, Conservation and Recycling, vol. 48, No. 4, pp. 315-338 (Oct. 1, 2006) (published online Apr. 18, 2006).

The PCT International Search Report and the Written Opinion of the International Searching Authority issued on Sep. 1, 2009 for related PCT International Application No. PCT/US08/077049 (published as WO 2009/039393).

International Preliminary Report on Patentability issued on Mar. 24, 2010 for related PCT International Application No. PCT/US2008/077049 (published as WO 2009/039393).

First Office Action from the State Intellectual Property Office of P.R. China dated Apr. 7, 2011 for related Chinese Patent Application No. 200880112151.9 (published as CN 101828074), translation provided by Unitalen Attorneys at Law.

Second Office Action from the State Intellectual Property Office of P.R. China dated Oct. 10, 2011 for related Chinese Patent Application No. 200880112151.9 (published as CN 101828074), translation provided by Unitalen Attorneys at Law.

Third Office Action from the State Intellectual Property Office of P.R. China dated Feb. 13, 2012 for related Chinese Patent Application No. 200880112151.9 (published as CN 101828074), translation provided by Unitalen Attorneys at Law.

Communication issued by the European Patent Office on Nov. 3, 2011 enclosing the Extended European Search Report and European Search Opinion dated Oct. 25, 2011 for related European Patent Application No. 08831553.6.

Communication issued by the European Patent Office on Nov. 22, 2011 for related European Patent Application No. 08831553.6.

Written Opinion of the International Searching Authority and the International Search Report issued on Sep. 24, 2007 in PCT International Application No. PCT/US2007/05976 (published as WO 2007/106372) (related to cross-referenced U.S. Appl. No. 13/356,305).

International Preliminary Report on Patentability Issued on Sep. 16, 2008 in PCT International Application No. PCT/US2007/05976 (published as WO 2007/106372) (related to cross-referenced U.S. Appl. No. 13/356,305).

The European Search Report and European Search Opinion issued on Jul. 6, 2009 in European Pat. App. No. 07752660.6 (published as EP 2001577) (related to cross-referenced U.S. Appl. No. 13/356,305).

Communication from the European Patent Office issued on Oct. 21, 2009 in European Pat. App. No. 07752660.6 (published as EP 2001577) (related to cross-referenced U.S. Appl. No. 13/356,305).

Applicant's Response to the Examination Report issued on Oct. 21, 2009 as filed with the European Patent Office on Apr. 30, 2010 in European Pat. App. No. 07752660.6 (published as EP 2001577) (related to cross-referenced U.S. Appl. No. 13/356,305).

Communication from the European Patent Office pursuant to Article 94(3) EPC issued on May 10, 2010 in European Pat. App. No. 07752660.6 (published as EP 2001577) (related to cross-referenced U.S. Appl. No. 13/356,305).

Applicant's Response to Communication under Article 94(3) EPC, issued on May 10, 2010, as filed with the European Patent Office on Jul. 6, 2010 in European Pat. App. No. 07752660.6 (published as EP 2001577) (related to cross-referenced U.S. Appl. No. 13/356,305).

Communication from the European Patent Office pursuant to Article 94(3) EPC issued on Nov. 29, 2011 in European Pat. App. No. 07752660.6 (published as EP 2001577) (related to cross-referenced U.S. Appl. No. 13/356,305).

First Office Action from the State Intellectual Property Office of P.R. China dated Oct. 28, 2010 for Chinese Patent Application No. 200780008692.2 (published as CN 101400430) (related to cross-referenced U.S. Appl. No. 13/356,305), translation provided by DEQI Intellectual Property Law Corporation.

Second Office Action from the State Intellectual Property Office of P.R. China dated Jun. 20, 2011 for Chinese Patent Application No. 200780008692.2 (published as CN 101400430) (related to cross-referenced U.S. Appl. No. 13/356,305), translation provided by DEQI Intellectual Property Law Corporation.

Notification to Grant Patent Right and Notification to Go Through the Formalities of Registration dated Nov. 4, 2011 for Chinese Patent Application No. 200780008692.2 (published as CN 101400430) (related to cross-referenced U.S. Appl. No. 13/356,305), translation provided by DEQI Intellectual Property Law.

Examiner's First Report dated Nov. 15, 2010 issued by IP Australia for Australian Patent App. No. 2007225296 (published as AU 2007225296) (related to cross-referenced U.S. Appl. No. 13/356,305).

Notice of Acceptance dated Dec. 13, 2011 issued by IP Australia for Australian Patent App. No. 2007225296 (published as AU 2007225296) (related to cross-referenced U.S. Appl. No. 13/356,305).

Official Action from the Patent Office of the Russian Federation Application dated Mar. 21, 2011 for Russian Patent Application No. 2008 140176 (published as RU 2008140176) (related to cross-referenced U.S. Appl. No. 13/356,305), translation provided by Sojuz Patent.

Communication issued on Mar. 8, 2012 enclosing the Extended European Search Report and European Search Opinion dated Mar. 1, 2012 for European Pat. App. No. 11186169.6 (not yet published) (related to cross-referenced U.S. Appl. No. 13/356,305).

Communication issued on Mar. 9, 2012 enclosing the Extended European Search Report and European Search Opinion dated Feb. 28, 2012 for European Pat. App. No. 11186172.0 (not yet published) (related to cross-referenced U.S. Appl. No. 13/356,305).

Communication issued on Mar. 8, 2012 enclosing the Extended European Search Report and European Search Opinion dated Feb. 28, 2012 for European Pat. App. No. 11186174.6 (not yet published) (related to cross-referenced U.S. Appl. No. 13/356,305).

Non-Final Office Action issued on Mar. 20, 2012 in cross-referenced U.S. Appl. No. 13/356,305.

* cited by examiner

METHODS AND DEVICES FOR REDUCING HAZARDOUS AIR POLLUTANTS

CROSS-REFERENCE TO RELATED APPLICATIONS

This application is a divisional of U.S. patent application Ser. No. 12/233,144 filed on Sep. 18, 2008, which issued as U.S. Pat. No. 7,993,616, and which claims the benefit of U.S. Provisional Patent Application No. 60/973,632 filed on Sep. 19, 2007. The entire disclosures of both of these references are incorporated herein by reference in their respective entireties.

FIELD AND BACKGROUND

The present disclosure relates to emissions abatement processes and in particular, to processes and devices that sequester air pollutants from combustion source effluent streams.

The statements in this section merely provide background information related to the present disclosure and may not constitute prior art.

Many industrial processes employ a combustion source during operation, including boilers, kilns, furnaces, and incinerators. Such combustion sources typically generate a variety of hazardous air pollutants, depending on the types of fuels burned, materials processed, burner design, and other operating parameters. Common hazardous air pollutants (HAPs) released by combustion sources include sulfur oxides, nitrous oxides, carbon dioxide, carbon monoxide, hydrochloric acid, chlorofluorocarbons, particulate matter, volatile organic compounds, aerosol compounds, mercury, lead, ammonia, ozone, and the like. Various air pollution control systems are used to reduce one or more of such air pollutants after effluent or flue gases exit the combustion source. Many such air pollution control devices are energy intensive and require high temperatures and large capital and maintenance expense.

SUMMARY

In various aspects, the present disclosure provides methods of reducing pollution generated by a combustion source. The methods include reducing an initial amount of sulfur oxides present in a fluid stream exiting a combustion source by contacting the fluid stream with a solid material formed by admixing a slag component having one or more reactive silicate compounds with a binder component. In various embodiments prior to contact with the solid material, the fluid stream has a temperature of less than about 600° F. (about 316° C.). Removal efficiency of the sulfur oxides present in the fluid stream is preferably above 20% and in various embodiments is even higher, reaching greater than or equal to about 70%, as compared to the initial amount of sulfur oxides present in the fluid stream prior to contact.

Another aspect of the disclosure provides a method of reducing pollution generated by a combustion source, comprising reducing an initial amount of nitrogen oxides present in a fluid stream exiting a combustion source by contacting the fluid stream with a solid material formed by admixing a slag component having one or more reactive silicate compounds with a binder component. Prior to contact with the solid material, the fluid stream has a temperature of less than about 600° F. (about 316° C.). The amount of nitrogen oxides present in the fluid stream after contact with the solid material is reduced by a removal efficiency of greater than or equal to about 20%, as compared to the initial amount of nitrogen oxides present in the fluid stream prior to contact.

Another embodiment of the present disclosure provides a method of reducing pollution generated by a combustion source, comprising reducing an initial amount of air pollutants comprising sulfur oxides, nitrogen oxides, and carbon dioxide, the air pollutants present in a fluid stream exiting a combustion source, by contacting the fluid stream with a solid material formed by admixing a slag component having one or more reactive silicate compounds with a binder component. In an exemplary embodiment, prior to contact with the solid material, the fluid stream has a temperature of less than about 600° F. (about 316° C.). The total amount of air pollutants present in the fluid stream after contact with the solid material is reduced by a removal efficiency of greater than or equal to about 20%, as compared to the initial total amount of air pollutants present in the fluid stream prior to contact.

In another aspect, the disclosure provides a pollution abatement system comprising a combustion source that generates an effluent stream comprising at least one air pollutant selected from the group consisting of: sulfur oxides, nitrogen oxides, carbon dioxide that is present in the effluent stream at an initial amount. The system includes a packed bed reactor having an inlet for receiving the effluent stream and an outlet. The reactor has at least one chamber comprising a plurality of solid particles having an average particle diameter size of about 0.25 mm to about 12 mm, wherein the solid particles are formed by admixing a slag component having one or more reactive silicate compounds with a binder component. The chamber has a volume to provide a sufficient residence time to reduce an amount of the air pollutant by a removal efficiency of greater than or equal to about 20% in the effluent stream as compared to the initial amount.

In another aspect, the disclosure provides a method of reducing pollution generated by a combustion source, comprising introducing an effluent fluid stream generated in a combustion source to a packed bed reactor, where the effluent stream has a temperature of less than about 600° F. (about 316° C.). The effluent fluid stream has an initial amount of at least one air pollutant selected from the group consisting of: sulfur oxides, nitrogen oxides, and carbon dioxide, and the packed bed reactor has at least one chamber comprising a plurality of solid particles having an average particle diameter size of about 0.25 mm to about 12 mm that are formed by admixing a slag component having one or more reactive silicate compounds with a binder component. The reactor preferably operates with a removal efficiency of the air pollutant of greater than or equal to about 20%.

In yet another aspect, the disclosure provides a method of reducing pollution generated by a combustion source, comprising monitoring an initial amount of at least one pollutant selected from the group consisting of: sulfur oxides, nitrogen oxides, and carbon dioxide, present in an effluent fluid stream generated in a combustion source. The pollutant in the effluent stream is reduced by introducing the effluent stream to a packed bed reactor at a temperature of less than about 600° F. (about 316° C.), wherein the reactor has at least one chamber comprising a plurality of solid particles having an average particle diameter size of about 0.25 mm to about 12 mm that are formed by admixing a slag component having one or more reactive silicate compounds with a binder component. The effluent exits the packed bed reactor having a reduced amount of pollutant, wherein a difference between the initial amount and the reduced amount is on average at least about 20% on an hourly basis.

In various other aspects, the disclosure provides methods of reducing sulfur oxides, nitrogen oxides, and/or carbon dioxide emissions from effluent streams generated by stationary combustion sources (e.g., boilers, incinerators), cement kilns, lime kilns, iron furnaces and steel furnaces. In this manner, various aspects of the disclosure provide an effective means for removing sulfur oxides, nitrogen oxides, and/or carbon dioxide emissions, thus controlling greenhouse gas emissions, while further recycling at least one industrial byproduct, and preferably multiple byproduct materials, to form a useful product.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Figure 4:
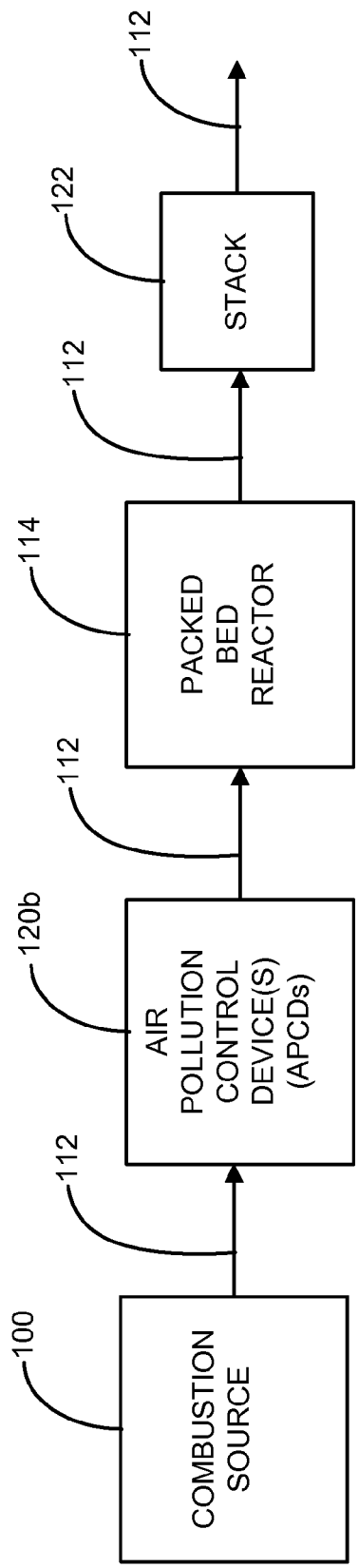
Figure 5:
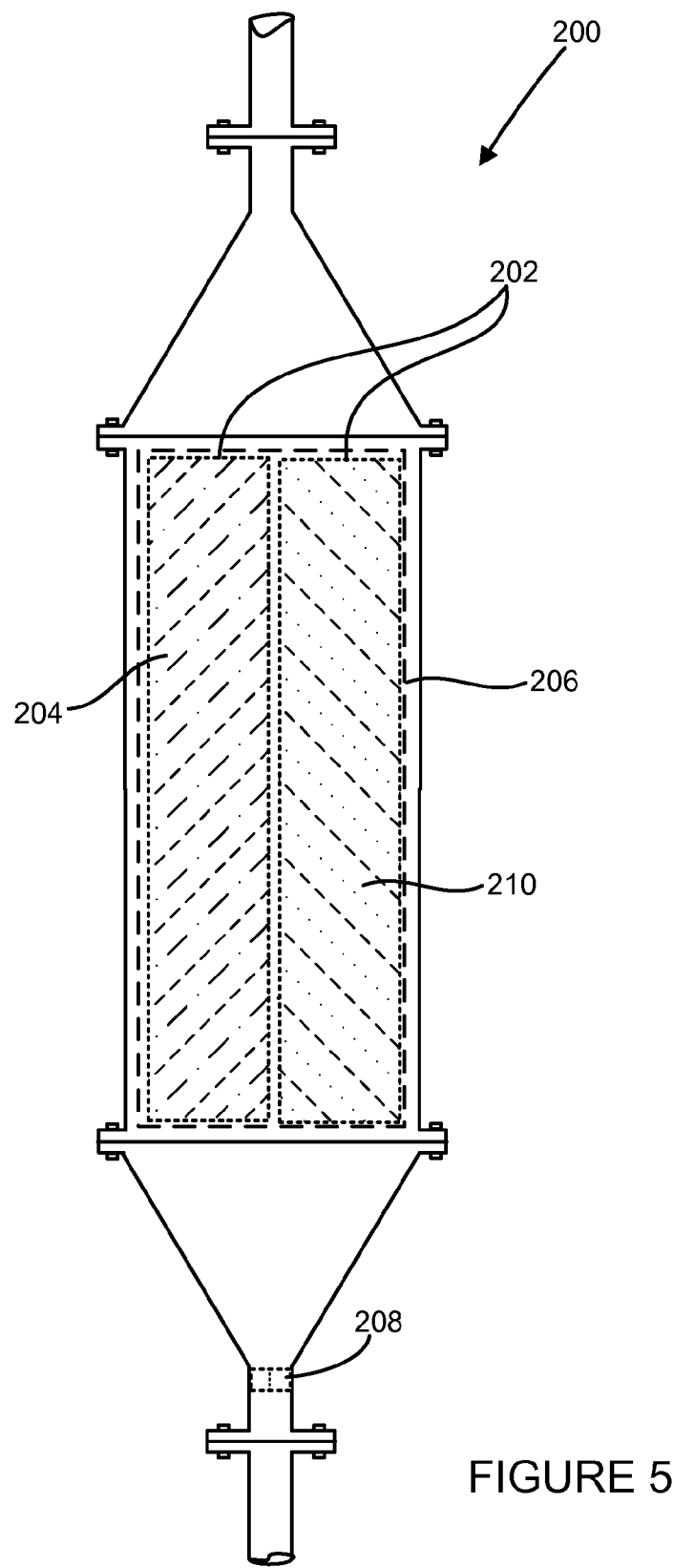

FIG. 4 is an exemplary process flow diagram for a method of reducing one or more hazardous air pollutants from a combustion source, which first is treated by an air pollution control device and then is treated with a pollution abatement system according to certain embodiments of the disclosure; and FIG. 5 is a schematic illustration of one embodiment of the present disclosure showing an emission abatement system with a packed bed reactor having an active chamber and an inactive chamber.

DETAILED DESCRIPTION

In various aspects, the teachings of the disclosure provide a process for reducing or sequestering one or more gaseous air pollutants present in an effluent fluid stream generated by a combustion source. In certain embodiments, the fluid stream comprises a gas and/or vapor, but may also have entrained solids and/or liquids, such as entrained particulates, liquid droplets and/or aerosols. In various aspects, the fluid stream is an effluent stream or an exhaust stream generated in a combustion source associated with an industrial process. The present disclosure provides a solid material that efficaciously removes one or more pollutants from the gas phase effluent stream. The solid material is formed by admixing a slag component with a binder component. In certain aspects, water is further admixed with the slag component and the binder component to form the solid material in a pelletized form. In various aspects, the solid material is in the form of a plurality of solid particles or agglomerates. The admixing of the slag component, the binder components, and optionally water, forms an agglomerated particle, which is in certain aspects amorphous and porous. The effluent stream is passed through a reactor containing the solid particles and contact between the effluent stream and solid material removes one or more air pollutants. In certain aspects, the one or more pollutants which are removed are selected from the group consisting of: sulfur oxides ($SO_X$) (including $SO_2$, $SO$, $SO_3$, and the like), nitrogen oxides ($NO_X$) (including $NO$, $NO_2$, and the like), and carbon dioxide ($CO_2$). In certain aspects, the solid particles of the pollution abatement systems of the present disclosure further remove additional air pollutants, such as carbon monoxide (CO), hydrochloric acid (HCl), chlorofluorocarbons (CFC), particulate matter (PM), volatile organic compounds (VOCs), aerosol compounds, mercury (Hg), lead (Pb), ammonia ($NH_3$), ozone ($O_3$), and combinations and equivalents thereof.

Thus, in accordance with the present disclosure, a particulate solid material is provided for use in methods of reducing the amount of pollutant present in the pollutant-containing effluent fluid stream. The solid particulate material comprises a slag component and a binder component. The solid particulate material is formed by admixing the slag component with the binder component. The slag component is distinct from the binder component and provides a source of reactive silicates. In certain aspects, the slag component and the binder component are further admixed with water and then substantially dried to a solid form prior to contact with the effluent stream. By "substantially dry" it is meant that the solid material has a water content of less than about 3% by weight of the total material, optionally less than about 1% by weight, and in certain aspects, less than about 0.5% by weight. In yet other embodiments, a solid particulate material is formed by admixing an additional component, namely a second component comprising both a source of alkali ions and a source of calcium oxide. In certain aspects, the solid particulate material optionally comprises a third component that is a source of calcium oxide (CaO) and a source of alkali metal ions.

Slag Component

Slag materials are industrial byproducts of metal manufacturing. In various embodiments, the slag component comprises a reactive silicate. Silicates are typically in a tetrahedral form that can be joined in chains, double chains, sheets, three-dimensional networks, and other polymerization ("geopolymer") forms. A silicate comprises silicon and oxygen atoms with one or more metals and/or hydrogen. Generally, the silicon and oxygen are in the form of $Si_xO_y$, where x is generally 1 or 2 and y can range from 2 to 7 (i.e., $SiO_2$, $SiO_3$, $SiO_4$, and $Si_2O_7$). While many silicates are insoluble or stable in water, it is believed that basic conditions and increased temperatures facilitate greater solubility and/or reactivity of certain silicate compounds in the presence of water. The water solubility and/or reactivity of the silicate compound in the presence of water depends upon numerous factors, including the cations with which the silicate anion is complexed (for example, Group IA alkali metal ion elements and $NH_4^+$ tend to form water soluble silicates).

Certain silicate species are more reactive with ionic species and may exhibit higher solubility in water, where such silicates are believed to ionize to form $SiO^-$ ions. For example, silicates can form various crystal structures, ranging from crystalline and highly-ordered phases (for example quartz) to crypto-crystalline phases (for example, extremely fine crystalline structures like chalcedony) to amorphous phases or glassy non-crystalline structures (for example, opal). It is believed that amorphous lattice structures permit higher ionic attack and breakdown of the silicate network. Thus, highly ordered and well-crystallized phases are stable and non-reactive, as where crypto-crystalline and amorphous silicate lattices are susceptible to attack due to disordered and open lattice structures, hence such silicates are reactive.

In accordance with various embodiments of the disclosure, the slag component of the solid particulate material comprises reactive silicates. While not limiting as to any theory by which the present teachings operate, it is believed that certain crystalline phases of dicalcium silicate (2 $CaO.SiO_2$ typically expressed in shorthand as $C_2S$) and tricalcium silicate (3 $CaO.SiO_2$ typically expressed in shorthand as $C_3S$), in particular the $\gamma$-$C_2S$, $\beta$-$C_2S$, and $C_3S$ crystalline phases, are reactive silicates that can be formed in slag materials, and thus suitably react with certain pollutants. For example, in the presence of water, such reactive silicates react with carbon dioxide. By reactive silicate compound, it is meant that more than 10% of the total silicate compounds present in a material will react with carbon dioxide in the presence of water at 25° C. (77° F.) and ambient pressure at pH of greater than or equal to about 9.

Increased temperatures generally increase solubility of silicate compounds in the presence of water. In accordance with various embodiments of the disclosure, it is preferred that the slag component comprises greater than or equal to about 5% reactive silicates, optionally greater than or equal to about 10%; optionally greater than or equal to about 15% of reactive silicates by weight on a dry basis.

Various slag materials comprise calcium silicates. Preferably, at least a portion of these calcium silicates are reactive with sulfur oxides, nitrogen oxides, carbon dioxide and/or calcium oxide in the presence of water in the various methods of the disclosure.

By way of background, slags are generally byproduct compounds generated by metal manufacturing and processing. The term "slag" encompasses a wide variety of byproduct materials, typically including a large portion of the non-metallic byproducts of ferrous metal and/or steel manufacturing and processing. Generally, slagging agents, or flux materials, are added to furnaces to strip impurities from the molten iron ore, steel scrap, iron and/or steel feed stock during processing. Typical flux materials are limestone ($CaCO_3$) and/or dolomite ($CaCO_3.MgCO_3$). Molten slag forms as a silicate melt floating to the top of the furnace that cools to form complex silicates and oxides. The composition of slag is dependent upon the metal being processed in the furnace and often contains metal sulfides and metal atoms in an elemental form. The composition and properties of the slag also vary based on the type of furnace and the post-processing treatment, which can affect not only the chemical composition, but the crystallinity, phase development, and surface morphology that can impact reactivity. For example, as discussed above, it is preferred that one or more reactive silicate phases are formed in the slag, such as $\gamma$-$C_2S$, $\beta$-$C_2S$, and $C_3S$. Further, the particle size, porosity, and surface area of the slag impacts the reactivity, as it is believed that lower particle size, higher porosity and hence higher surface area materials may enable greater exposure to pollutants and water to facilitate greater reaction with the target air pollutants.

Blast furnaces process iron ore to form refined pig iron. Blast furnace slags are generally formed into three main types: air-cooled, granulated, and pelletized (or expanded). Air-cooled blast furnace slag is formed by allowing the molten slag to cool relatively slowly under ambient condition, while the final cooling can be accelerated with a cooling process, such as water spray. Granulated slag is formed by quenching molten slag in water, thus forming small disordered-structure glass particles. Such granulated slag is often further ground, thereby enhancing the cementitious properties of the material. Pelletized or expanded slag is cooled through a water jet, which leads to rapid steam generation that develops extensive vesicle structures in the material.

Steel slags are formed during the further processing of pig iron and other steel materials in steel-making furnaces. Typical steel furnaces include basic oxygen process furnaces (BOF), open hearth furnaces (OHF), and electric arc furnaces (EAF). Most steel is now made in integrated steel plants using a version of the basic oxygen process or in specialty steel plants that use an electric arc furnace process. In an exemplary basic oxygen process, hot liquid blast furnace metal, scrap, and fluxes are charged to a converter (furnace). A lance is lowered into the converter and high-pressure oxygen is injected. The oxygen combines with and removes the impurities in the charge. These impurities consist of carbon as gaseous carbon monoxide, and silicon, manganese, phosphorus and some iron as liquid oxides, which combine with lime and/or dolomite to form the steel slag. At the end of the refining operation, the liquid steel is poured into a ladle while the steel slag is retained in the vessel and subsequently tapped into a separate slag pot.

Many different grades of steel can be produced and the properties of the steel slag can change significantly with each grade. Grades of steel can be classified as high, medium, and low, depending on the carbon content of the steel. Higher-grade steels often have higher carbon content. To reduce the amount of carbon in the steel, greater oxygen levels are required in the steel-making process. This also requires the addition of increased levels of flux material for the removal of impurities from the steel and increased slag formation. So called "carbon slags" have a carbon content above an impurity level. For example, representative carbon content in a carbon slag include those greater than or equal to about 0.01 wt. %, optionally greater than or equal to about 0.1 wt. %, optionally greater than or equal to about 0.5 wt. %, optionally greater than about 1 wt. %.

Steel furnace slag typically contains much higher amounts of dicalcium silicate and calcium oxide. There are several different types of steel slag produced during the steel-making process, including furnace (or tap) slag, raker slag, synthetic (or ladle) slags, and pit (or cleanout) slag. The steel slag produced during the primary stage of steel production is referred to as furnace slag or tap slag. After being tapped from the furnace, the molten steel is transferred in a ladle for further refining to remove additional impurities still contained within the steel, which generates additional steel slags by again adding fluxes to the ladle to melt. These slags are combined with any carryover of furnace slag and assist in absorbing deoxidation products (inclusions), heat insulation, and protection of ladle refractory. The steel slags produced at this stage of steel making are generally referred to as raker and ladle slags. Pit slag and clean out slag are other types of slag commonly found in steel-making operations. They usually include the steel slag that falls on the floor of the plant at various stages of operation, or slag that is removed from the ladle after tapping. The ladle refining stage usually involves comparatively high flux material addition and the properties of these synthetic slags are often significantly different from those of the furnace slag. Such slags are often rich in calcium oxide and silicates and are well suited as a material for the slag component of the solid particulate material, particularly as these synthetic slags cannot generally be recycled as aggregates due to expansion in situ.

It should be noted that the slag component may comprise a combination of slags originating from different locations of the furnace and/or processing or may include combinations of slags from different furnaces or processes. The term "furnace" encompasses both iron ore and steel converters. Generally, blast furnace slags refer to those generated in iron ore furnaces and steel slags are those generated by any steel forming or refining process, including stainless steel slags, as will be described in more detail below. Depending on the location from which they originate in the process and subsequent processing, many of the slags have different particle size distributions, different mineralogy and crystal formation. These slags may be further ground to achieve desirable particle size distributions and/or fineness (surface area).

Exemplary slags comprise calcium-containing compounds, silicon-containing compounds, aluminum-containing compounds, magnesium-containing compounds, iron-containing compounds, manganese-containing compounds and/or sulfur-containing compounds. In certain embodiments of the disclosure, the slag material(s) of the slag component are selected to comprise calcium oxide at about 25 to about 60%, optionally about 30 to about 50%, and optionally about 30 to about 45% by weight. In various embodiments, the slag component comprises silicon dioxide ($SiO_2$) at greater than or equal to about 25% by weight; optionally greater than or equal to about 30% by weight; optionally greater than or equal to about 35% by weight. It should be noted that the amount of $SiO_2$ present in the composition is reflective of the simple oxide analysis. As used herein, all percentages are on a weight basis, unless indicated as otherwise. It should be noted that the chemical compositions of various materials described herein are expressed in terms of simple oxides calculated from elemental analysis, typically determined by x-ray fluorescence techniques. While the various simple oxides may be, and often are, present in more complex compounds in the material, the oxide analysis is a useful method for expressing the concentration of compounds of interest in the respective compositions. A simple oxide analysis does not necessarily reflect the concentration of reactive silicates, which may only form a portion of the total amount of $SiO_2$ present in the material.

In certain embodiments, the slag component further comprises calcium oxide (CaO) at greater than or equal to about 25%; optionally greater than or equal to about 30% by weight; optionally greater than or equal to about 35% by weight. As discussed above, the calcium oxide and silicon oxide are typically present in the form of calcium silicates, however, based on the overall simple oxide analysis, are present at respective amounts of greater than or equal to about 25% by weight. In certain embodiments, the slag component comprises one or more active ingredients selected from the group $CaSiO_3$, CaO, and combinations thereof, where a total amount of the active ingredient present in the slag component is about 35 to about 90% by weight.

In certain embodiments, the slag component comprising a slag has a composition as set forth in Table I, exclusive of impurities and diluents.

TABLE I

| Oxide/Metal | Approximate Weight % |
| --- | --- |
| Calcium Oxide (CaO) | 35-55 |
| Silica ($SiO_2$) | 10-35 |
| Aluminum Oxide ($Al_2O_3$) | 0.1-10 |
| Iron Oxide (FeO) (70-80% FeO & 20-30 $Fe_2O_3$) | 0.1-40 |
| Magnesium Oxide (MgO) | 3-10 |
| Manganese Oxide (MnO) | 3-10 |
| Sulfate ($SO_3$) | 0.01-15 |
| Phosphate ($P_2O_5$) | 0.01-1 |
| Metallic Iron | 0.5-10 |

One example of a suitable slag generally having cementitious properties and reactive silica is ground granulated blast furnace slag (GGBFS). The cooling rate of slag is typically sufficiently low so that various crystalline compounds are generally formed, including predominant compounds such as dicalcium silicate, tricalcium silicate, dicalcium ferrite, meriwinite, calcium aluminate, calcium-magnesium iron oxide, free lime, and free magnesia.

Stainless steel slags are particularly suitable materials for use as the slag component, as they typically comprise relatively high concentrations of free lime and/or free magnesia, and relatively high concentrations of silicates, particularly in the reactive silicate crystalline form of $\gamma$-$C_2S$. During crystal development and phase transition, this $\gamma$-$C_2S$ phase is believed to cause instability in the $C_2S$ crystal lattice that causes fragmentation to fine powder form due to self-pulverization.

As appreciated by those of skill in the art, varying amounts of elements, such as nickel, chromium, molybdenum, and manganese, can be added to refined iron to form steel: the greater the amounts of these elements that are included, the higher the grade of steel. These elements tend to be incorporated into the compounds present in the slag that is used to refine the metals. In general, stainless steel contains at least about 10.5% chromium. Typical austenitic steel has chromium at greater than or equal to about 16% and nickel at greater than or equal to about 8%. Stainless steel comprises carbon up to about 1.7% by weight. Higher grades of stainless steel usually have lower carbon contents and may contain molybdenum and manganese, inter alia. By way of example, a low Grade 304 austenitic stainless steel has carbon (C) at less than or equal to 0.08%, chromium (Cr) from between about 17 to 19.5%, nickel (Ni) from about 8 to 10.5%, manganese (Mn) at less than or equal to about 2%, with no molybdenum (Mo). Another exemplary higher grade steel is 316L where carbon (C) is present at less than or equal to 0.03%, chromium (Cr) at about 17%, nickel (Ni) at about 9%, manganese (Mn) at about 2%, and molybdenum (Mo) at about 2.5%. "L" designates low carbon content. A higher grade austenitic stainless steel is Grade 317LMN that has carbon (C) at less than or equal to 0.03%, chromium (Cr) from between about 16.5 to 18.5%, nickel (Ni) from about 13.5 to 17.5%, manganese (Mn) from about 1 to 2%, and molybdenum (Mo) from about 4 to 5%. In the 317LMN grade, the "M" and "N" designations indicate that the composition contains increased levels of molybdenum and nickel respectively. Stainless steel slags tend to incorporate these various elements and further comprise a high amount of reactive and/or water soluble silicates, which are highly desirable for forming solid particulate materials in various embodiments of the disclosure.

The slag component can further comprise other sources of reactive silicates, in addition to the slag described above, so long as they contribute desirable and/or necessary active ingredients discussed above. Other suitable examples include blast (cupola) furnace dust collected from air pollution control devices attached to blast furnaces, such as cupola arrester filter cake. Another suitable industrial byproduct source is paper de-inking sludge ash. Many different manufactured/industrial process byproducts may be feasible as a source of reactive silicates of the solid particulate material in accordance with the present disclosure. Many of these well known byproducts comprise alumina and/or silica, as well. Combinations of any of the exemplary manufactured products and/or industrial byproducts are contemplated for use in certain embodiments of the disclosure.

Binder Components

In various embodiments, a binder component is admixed with the slag component to form an agglomerated particulate solid form. In various aspects, such a binder component is capable of generally maintaining the slag component in a solid particulate material form, having a predetermined size, so that the particulate material withstands both transport and handling, as well as use in an industrial pollution abatement device. As described in greater detail below, in various embodiments, the solid particulate materials having the slag and binder components are disposed in a packed bed reactor. An effluent stream is introduced to the packed bed reactor and flows through a bed of the solid particulate material, where one or more air pollutants are removed by contact with the solid material. Combinations of any of the exemplary binder components are contemplated for use in certain embodiments of the disclosure. In various aspects, the binder component comprises a material selected from the group consisting of ordinary Portland cement, Portland cement clinker, guar gum, starch, molasses, and combinations thereof.

In certain aspects, the solid particulate material is formed by admixing the binder component with the slag component a ratio of the slag component to the binder component of about 6:1 to about 99:1 on a dry basis. In certain aspects, the solid particulate material is formed by admixing about 1 to about 20% by weight of the binder component of the total mixture on a dry basis, optionally about 3 to about 10% by weight binder component, and optionally about 4 to about 6% by weight binder component of the total mixture on a dry basis. Additionally, in certain aspects, the binder component and the slag component are admixed in the presence of water to form the solid material particulates, for example, the binder and slag components can be admixed with about 5 to 30% water by weight on a wet basis, optionally about 7 to about 20% water, and in some aspects about 10 to about 15% by weight water on a wet basis. The binder component and the slag component are mixed, in certain aspects homogeneously and/or thoroughly mixed, to form the solid particulate material.

Portland Cement

In certain embodiments of the present disclosure, the binder component is selected to be a hydraulic cementitious composition. Thus, in certain aspects, the binder component comprises a Portland cement component, including by way of example, ordinary Portland cement (OPC), modified Portland cements, blended hydraulic cements, and cement clinker. By "hydraulic cement" it is meant that the cement will set and harden via hydration of the mineral components in the cement, even when immersed in water. "Portland cement" is well known in the art and can be manufactured in a wet or a dry process kiln. While the wet and dry processes differ, both processes heat the raw material in stages. Cement manufacturing raw materials comprise calcium, silica, iron, and alumina at varying proportions, and usually include limestone, as well as a variety of other materials, such as clay, sand, or shale, for example.

The first stage of cement manufacturing is a pre-heating stage that drives off any moisture from the raw materials, removes water of hydration, and raises the material temperature up to approximately 1500° F. (approximately 800° C.). The second stage is the calcination stage which generally occurs between about 1500° F. and 2000° F. (approximately 1100° C.), where the limestone ($CaCO_3$) is converted to lime (CaO) by driving off carbon dioxide ($CO_2$) in a calcination reaction. The raw materials are then heated to a maximum temperature of between about 2500° F. to 3000° F. (approximately 1400° C. to 1650° C.) in the burning zone, where they substantially melt and flux, thus forming inorganic compounds, such as dicalcium silicate ($C_2S$ or $2CaO.SiO_2$), tricalcium silicate ($C_3S$ or $3CaO.SiO_2$), tricalcium aluminate ($C_3A$ or $3CaO.Al_2O_3$), and tetracalcium aluminoferrite ($C_4AF$ or $4CaO.Al_2O_3.Fe_2O_3$). The molten raw material is cooled to solidify into an intermediate product in small lumps, known as "clinker" that is subsequently removed from the kiln. Cement clinker is then finely ground and mixed with other additives (such as a set-retardant, gypsum) to form ordinary Portland cement. ASTM, International Test C 150 called the "Standard Specification for Portland Cement" provides eight types of ordinary Portland cement for different applications, namely: Types I, IA, II, IIA, III, IIIA, IV, and V. In certain aspects, the binder component comprises Portland Cement selected to be Type I, IA, III, and/or IIIA.

Generally, a Portland cement comprises about 35 to about 65% of $C_3S$, about 15 to about 40% of $C_2S$, about 0 to about 15% $C_3A$, and about 6 to about 20% $C_4AF$, although these hydraulic active components may vary based upon the type of cement. A typical simple metal oxide analysis of ordinary Type I Portland cement contains approximately 64% CaO, 21% $SiO_2$, 5% $Al_2O_3$, 3% $Fe_2O_3$, with lesser amounts of other compounds, such as oxides of magnesium, sulfur, potassium, sodium, and the like. A simple oxide analysis calculated from elemental analysis is conventional in the art, however, as appreciated by those of skill in the art, the various active compounds may actually be present in the source as more complex molecules, for example, as $C_2S$, $C_3S$, $C_3AF$, and $C_3A$.

In certain embodiments, the binder component comprises Portland cement clinker having a composition with major components and parameters as set forth in Table II, exclusive of impurities and diluents.

TABLE II

| Oxide/Metal | Approximate Weight % |
| --- | --- |
| Calcium Oxide (CaO) | 59-68 |
| Silica ($SiO_2$) | 18-27 |
| Aluminum Oxide ($Al_2O_3$) | 2-7 |
| Iron Oxide (FeO) (70-80% FeO & 20-30 $Fe_2O_3$) | 0.2-6.5 |
| Magnesium Oxide (MgO) | 0.5-5 |
| Sulfate ($SO_3$) | 1.5-5 |
| $Na_2O_e$ equivalent | 0.05-1.3 |
| Loss on Ignition % (LOI) | 0-3 |

The alkali content of various pozzolanic and/or cementitious materials can be expressed as a sodium equivalent ($Na_2O_e$) which accounts for the presence of both $Na_2O$ and $K_2O$ calculated by the equation $$z = x + (0.658 \cdot y) \quad \text{(EQN. 1)}$$

where z is the sodium equivalent $Na_2O_e$, x is the amount of $Na_2O$ present in the composition, and y is the amount of $K_2O$ present in the composition. Such sodium equivalents "$Na_2O_e$" may range from greater than 0.01%, to greater than or equal to about 0.5% by weight, optionally greater than or equal to about 1% by weight in Portland cement. Loss on ignition (LOI) quantifies an amount of volatile materials (water, carbon dioxide, hydrates, and organic materials) present in the sample, generally indicating the extent to which the pyroprocessing is conducted. Exemplary LOI testing parameters are set forth in ASTM Test C 114 "Standard Test Methods for Chemical Analysis of Hydraulic Cement," where a sample is heated and the loss of mass measured to evaluate volatile species loss.

As recognized by those of skill in the art, Portland cement clinkers can be subsequently mixed with additive materials at amounts up to about 15% by weight, optionally ranging from about 2 to about 10% by weight. Examples of typical Portland cement additives include gypsum (calcium sulfate), fly ash, and ground granulated blast furnace slags.

The solid particulate material formed by admixing the binder component comprising Portland cement has about 1 to about 15% by weight binder component of the total mixture on a dry basis, optionally about 3 to about 12% by weight Portland cement binder component, and optionally about 4 to about 10% by weight Portland cement binder component of the total mixture. In certain preferred aspects, the Portland cement is provided at about 5% to about 10% by weight to the total dry mixture.

As discussed above, in various aspects, the admixing of the binder component with the slag component occurs in the presence of water. As recognized by those of skill in the art, the amount of water present in a system dictates the amount of cementitious phase formation, hence the extent of strengthening, hardening, and agglomeration. For example, water to Portland cement ratios in typical concrete range from less than 0.35 to about 0.65, with a minimum amount of 0.25 generally provided to complete the hydration reactions of cement compounds. Thus, in accordance with the present teachings, about 8 to about 25% by weight water is added to the dry mixture, optionally about 10 to about 15% by weight water is added to the dry mixture including the slag component and the binder component. After the binder component including Portland cement has cured or hardened via the hydraulic reactions, an agglomerated solid material is formed for use in the pollution abatement devices and methods of the present teachings.

Starch-Based Binder Components

In certain aspects, the binder component comprises starch-based binder components. A starch is generally classified as a mixture of complex carbohydrate glucans having α-amylose and amylopectin. α-amylose is a linear polymeric molecule linked by α (1→4) bond and amylopectin is a branched polymeric molecule having α (1→4) linked glucose residues and α (1→6) branch points at regular intervals (e.g., averaging every 24-30 glucose residues). The ratio of amylose to amylopectin is typically from 1:2 to about 1:4 in a starch molecule. Suitable starches are derived from various plants, including rice, wheat, corn, tapioca, and/or potatoes. Starch-based binder components may optionally be modified to improve various physical properties, such as thickening or adhesive properties or may be provided in unmodified form. Chemical modification may include esterification or pregelatinization. Thus, the term "starch-based binder" encompasses not only starches isolated or extracted from natural plant sources, but also encompasses derivatives, synthetic or semi-synthetic equivalents of such a natural component. Starch-based binder components are often mixed in water, where the starch-based component is present at about 25% to about 90% by weight, optionally about 35 to about 50% by weight of starch with the remainder water and/or solvents, such as polyvinyl alcohol.

The solid particulate material formed by admixing the binder component comprising starch or a starch derivative has about 1 to about 15% by weight binder component of the total mixture on a dry basis, optionally about 1 to about 5% by weight starch binder component, and optionally about 3 to about 5% by weight binder component of the total mixture.

Guar Gum

In certain aspects, the binder component comprises guar gum. Guar gum, also known as guaran is a galactomannan (a polysaccharide having a mannose backbone with galactose side groups), is generally derived from the seed of the plant *Cyamopsis tetragonoloba*. Guar gum typically has a ratio of mannose to galactose residues of about 1.5:1 to about 2:1.

Guar gum is a thickener and emulsifier and can be cross-linked in the presence of certain agents, such as calcium (which may be present in the slag component, another binder component, or in a third component). "Guar gum" encompasses not only extracts isolated or extracted from the *Cyamopsis tetragonoloba* plant, but also encompasses derivatives, synthetic or semi-synthetic equivalents of such a natural extract. Guar gum may be provided in aqueous or dry forms, which can optionally be reconstituted with water or solvent. An exemplary guar gum has a representative water content of about 40 wt. % to about 60 wt. %

The solid particulate material formed by admixing the binder component comprising guar gum has about 1 to about 15% by weight binder component of the total mixture on a dry basis, optionally about 1 to about 5% by weight guar gum binder component, and optionally about 1 to about 3% by weight binder component of the total mixture.

Molasses

In certain aspects, the binder component comprises molasses or other sucrose-based binder components. Molasses, also known as sorghum syrup, is a thick syrup by-product produced during sugar cane or sugar beet refinement. Molasses is commonly treated with sulfur dioxide as a preservative and is referred to as "sulfured molasses." During conventional sugar cane processing, juice is extracted from plant matter and then boiled to crystallize and remove sucrose. This process is typically repeated three times, generating so-called "first molasses," "second molasses," and finally "blackstrap molasses," each having successively reduced amounts of sucrose. For sugar beet processing, the juice is extracted from sugar beet and boiled for crystallization, however, usually only the final crystallization step forms so-called "beet-molasses." As used herein, "molasses" generally refers to a byproduct generated during a sugar extraction and refinement process and includes equivalents, derivatives, synthetic or semi-synthetic equivalents of such a natural byproduct. Molasses is a thickening adhesive agent, which when mixed with the slag component of the present teachings, provides a desired solid particulate form.

Molasses binder components can be provided in hydrated or dehydrated forms. When hydrated, molasses generally has a water-content of about 15 to about 60% by weight, optionally about 20 to about 50% by weight.

Third Calcium Oxide and Alkali Component

In various embodiments, the solid particulate material optionally comprises a third component comprising calcium oxide (CaO) and a source of alkali metal ions, such as sodium and/or potassium ions, for example. In certain embodiments, the third component comprises a material that is generated or manufactured in an industrial process. As will be described in more detail below, some embodiments employ a beneficial reuse for waste materials that would otherwise be discarded, stockpiled, or land-filled. However, various suitable sources of calcium oxide and alkali metal ions may be naturally occurring materials, such as minerals, or may be manufactured commercial products. In various aspects, the third component comprises a material selected from the group consisting of cement kiln dust, lime kiln dust, sugar beet lime, clinker dust, slaked lime, quick lime, and any combinations thereof. Such mixtures encompass any combination of two or more components. In certain embodiments, the third component comprises a material selected from the group consisting of cement kiln dust, lime kiln dust, sugar beet lime, and combinations thereof. The third component can comprise other sources of calcium oxide and alkali metal ions, including by way of example, waste water treatment plant sludge, pulp and paper sludge, calcium carbide manufacturing byproducts, and other materials providing calcium oxide and alkali metal ions, as are well known to the skilled artisan.

As appreciated by one of skill in the art, many of the sources of calcium oxide and alkali metal ions can have varied compositions, depending on the particular process in which they are made; the specific compositions of raw materials and fuels that are employed to manufacture the source; the conditions and duration that the material is stored or stockpiled; as well as a variety of other factors.

In this regard, in some embodiments, the third component preferably comprises one or more active ingredients selected from the group consisting of: CaO, $K_2O$, $Na_2O$, and combinations thereof. In certain embodiments, the third component comprises one or more active ingredients selected from the group consisting of: CaO, $Na_2O$, $K_2O$, and combinations thereof, where a total amount of the active ingredients present in the solid particulate material is at about 30% to about 60% by weight. The third component optionally comprises additional active compounds in addition to the calcium oxide and alkali oxides and such active ingredients are not restricted to those recited above. In certain aspects, the third component comprises calcium oxide (CaO) at greater than or equal to about 30% by weight.

In various aspects, the third component comprises free lime (free CaO) at greater than or equal to about 3% by weight. "Free lime" refers to the free calcium oxide (free CaO) readily available in a material for a hydration reaction with water. Unslaked lime, also referred to as quick lime, contains a high concentration of dehydrated (free) lime or calcium oxide (CaO) that can undergo reaction with water, i.e., slaking. In contrast, a slaked or hydrated lime has already been reacted with water to form $Ca(OH)_2$. Free lime content is often used as an indicator of the reactivity of the calcium oxide containing materials. In certain embodiments of the disclosure, the free lime may be about 5% or even greater.

In some embodiments, the third component preferably comprises an amount of alkali ion source in the form of sodium oxide ($Na_2O$) and/or potassium oxide ($K_2O$) at greater than or equal to about 1% by weight. It should be noted that some alkali metal ions complex with various complex anions, such as sulfates, however, a typical analysis of alkali content expresses the alkali metal oxides and sulfates individually. In certain embodiments, the amount of alkali ion source in the form of sodium oxide ($Na_2O$) and/or potassium oxide ($K_2O$) is greater than or equal to about 3% by weight; optionally greater than or equal to about 4% by weight.

Sodium equivalents $Na_2O_e$ (see EQN. 1) may range from greater than 0.01%, to greater than or equal to about 1% by weight, optionally greater than or equal to about 2% by weight, optionally greater than or equal to about 3% by weight, and in some embodiments, greater than or equal to about 5% by weight As will be discussed in greater detail below, the alkali metal ions promote desirable reaction conditions for the solid material, such as providing a high pH that is believed to provide a faster rate of reaction with one or more pollutants and to favor formation of preferred products in the solid particulate material reaction with certain pollutants, specifically for example, carbon dioxide.

In certain embodiments, the third component has a composition as set forth in Table III, exclusive of impurities and diluents.

TABLE III

| Oxide | Approximate Weight % |
| --- | --- |
| Calcium Oxide (CaO) | 30-45 |
| Silica ($SiO_2$) | 10-20 |
| Aluminum Oxide ($Al_2O_3$) | 2-7 |
| Iron Oxide ($Fe_2O_3$) | 1-3 |
| Magnesium Oxide (MgO) | 0.5-3 |
| Sulfate ($SO_3$) | 1-15 |
| Sodium Oxide ($Na_2O$) | 0.1-1 |
| Potassium Oxide ($K_2O$) | 0.1-15 |

In some embodiments, the third component comprises cement kiln dust (CKD), which generally refers to a byproduct generated within a cement kiln or related processing equipment during Portland cement manufacturing. Portland cement can be manufactured in a wet or a dry process kiln. While the wet and dry processes differ, both processes heat the raw material in stages. Cement manufacturing raw materials comprise sources of calcium, silica, iron, and alumina, and usually include limestone, as well as a variety of other materials, such as clay, sand and/or shale, for example.

Generally, CKD comprises a combination of different particles generated in different areas of the kiln, pre-treatment equipment, and/or material handling systems, including for example, clinker dust, partially to fully calcined material dust, and raw material (hydrated and dehydrated) dust. As appreciated by those of skill in the art, the composition of the CKD varies based upon the raw materials and fuels used, the manufacturing and processing conditions, and the location of collection points for CKD within the cement manufacturing process. CKD can include dust or particulate matter collected from kiln effluent (i.e., exhaust) streams, clinker cooler effluent, pre-calciner effluent, air pollution control devices, and the like. Clinker cooler dust refers to dust collected in the clinker cooler areas of the kiln and typically has a chemical composition that is very similar to Portland cement.

While CKD compositions will vary for different kilns, CKD usually has at least some cementitious and/or pozzolanic properties, due to the presence of the dust of clinker and calcined materials. Typical CKD compositions comprise silicon-containing compounds, such as silicates including tricalcium silicate, dicalcium silicate; aluminum-containing compounds, such as aluminates including tricalcium aluminate; and iron-containing compounds, such as ferrites including tetracalcium aluminoferrite. CKD generally comprises relatively high amounts of calcium oxide (CaO). Exemplary CKD compositions comprise calcium oxide at about 10 to about 60% by weight, optionally about 25 to about 50% by weight, and optionally about 30 to about 55% by weight. In some embodiments, CKD comprises a concentration of free lime of about 1 to about 10%, optionally of about 1 to about 5%, and in some embodiments about 3 to about 5%. Further, CKD typically comprises sodium and potassium alkali metal ions respectively at about 0.1 to about 10% by weight, and optionally about 0.2 to about 5% by weight. CKD may comprise additional alkali metal ions, alkaline earth metal ions, and sulfur, inter alia. CKD also typically comprises silica ($SiO_2$) at about 10 to about 20% by weight, alumina ($Al_2O_3$) at about 2 to about 7% by weight, and iron oxide ($Fe_2O_3$) at about 1 to about 3% by weight.

Exemplary CKD dusts have specific gravity ranges from about 2.6 to 2.8, a maximum particle size of about 0.30 mm (300 μm) and Blaine fineness (specific surface area) ranging from about 4,600 to about 14,000 $cm^2/g$.

In certain embodiments, the third component of the solid particulate material of the disclosure comprises lime (i.e., quick lime) or lime kiln dust (LKD). LKD is a byproduct from the manufacturing of lime. LKD is dust or particulate matter collected from a lime kiln or associated processing equipment. Manufactured lime can be categorized as high-calcium lime or dolomitic lime, and LKD varies based upon the processes that form it. Lime is often produced by a calcination reaction conducted by heating calcitic raw material, such as calcium carbonate ($CaCO_3$), to form free lime CaO and carbon dioxide ($CO_2$). High-calcium lime has a high concentration of calcium oxide and typically some impurities, including aluminum-containing and iron-containing compounds. High-calcium lime is typically formed from high purity calcium carbonate (about 95% purity or greater). Typical calcium oxide content in an LKD product derived from high-calcium lime processing is similar to the concentration of calcium oxide in the lime product itself, and can be greater than or equal to about 75% by weight, optionally greater than or equal to about 85% by weight, and in some cases greater than or equal to about 90% by weight. In some lime manufacturing, dolomite ($CaCO_3.MgCO_3$) is decomposed by heating to primarily generate calcium oxide (CaO) and magnesium oxide (MgO), thus forming what is known as dolomitic lime. In lime or LKD generated by dolomitic lime processing, calcium oxide can be present at greater than or equal to about 45% by weight, optionally greater than or equal to about 50% by weight, and in certain embodiments, greater than or equal to about 55% by weight. While both lime and LKD vary based upon the type of lime processing employed, they generally have relatively high concentrations of free lime. Typical amounts of free lime in such lime or LKD products are about 10 to about 50%, optionally about 20 to about 40%.

Further, LKD and lime products typically comprise sodium and potassium alkali metal ions at respective amounts of about 0.01 to about 1% by weight, and optionally about 0.03 to about 0.25% by weight. Lime and/or LKD may comprise additional alkali metal ions, alkaline earth metal ions (such as the MgO described above), and sulfur, inter alia. LKD also comprises silica ($SiO_2$) at about 1 to about 10% by weight, alumina ($Al_2O_3$) at about 0.1 to about 5% by weight, and iron oxide ($Fe_2O_3$) at about 0.5 to about 2% by weight. Exemplary LKDs have specific gravity ranging of about 2.6 to 3.0, a maximum particle size of about 2 mm (2,000 µm) and Blaine fineness (specific surface area) ranging from about 1,300 to about 10,000 $cm^2/g$.

Another exemplary material for use as a third component of the solid particulate material of the present disclosure is a sugar refining lime byproduct. Lime is used in the production of sugar derived from sugar cane, sugar beets, maple sap and sorghum. For example, sugar cane and sugar beets are harvested and processed with water to form raw juice (usually a molasses product), which has low pH and contains dissolved impurities. The sugar juice thus contains sucrose, pulp, various non-sugars, e.g., organic and inorganic salts, amino acids, dyes and high molecular substances, such as protein and pectin. Hydrated lime is added to the juice to raise the pH and to react with the impurities to form insoluble calcium organic compounds that can be removed. In a conventional sugar purification method, lime (CaO) and carbon dioxide ($CO_2$) are added, which results in the formation of a precipitate (sludge) consisting of calcium carbonate and part of the above-mentioned non-sugar components. The dewatered sludge comprises calcium oxide (CaO), usually in hydrated form ($Ca(OH)_2$). The sugar juice may be further successively refined in this manner. Sugar beets tend to require the greatest amount of refinement with lime, and the sludge byproduct is generally referred to as "sugar beet lime." However, the use of the term "sugar beet lime" is merely representative of the class of the sugar processing lime byproducts that are suitable for use in the solid particulate materials of the disclosure.

In sugar beet lime, calcium oxide can be present at greater than or equal to about 25% by weight, optionally greater than or equal to about 30% by weight, and in certain embodiments, greater than or equal to about 40% by weight. Sugar beet lime also typically comprises alkali metal ions, such as sodium and potassium, respectively present at about 0.01% by weight or greater; optionally greater than or equal to about 0.05% by weight, optionally greater than or equal to about 0.1% by weight, and in some embodiments greater than or equal to about 1% by weight of the composition.

In various embodiments, the solid particulate material comprises a binder component at about 1 to about 20% by weight, a slag component at about 80 to about 97% by weight. In certain aspects, a solid particulate material comprises about 5% to about 10% binder component comprising Portland cement and a slag component comprising stainless steel slag at about 95% by weight on a dry basis (as described previously above). When an optional third component is present in the solid particulate material, the binder component is present at about 1 to about 15% by weight, the slag component at about 40 to about 70% by weight, and the third component at about at between about 15 to about 57% by weight. In certain aspects, a solid particulate material comprises about 5% to about 10% binder component comprising Portland cement and a slag component comprising stainless steel slag at about 30 to 65% by weight and a third component comprising CKD at about 30 to about 65% by weight of the total solid particulate material composition. Optionally, the slag component is present at about 40 wt. %, the CKD is present is about 40 wt. % and the binder component of Portland cement is present at about 10 wt. % on a dry basis. Alternately, a ratio of the slag component to the third component ranges from about 99:1 to about 1:99, optionally about 0.5:1 to about 1:0.5, and is optionally about 1:1. The slag and binder components, as well as optional water, third component, or other optional additives, can be combined and processed in a mixer, agitator, or mill to achieve sufficient mixing of the respective components.

Thus, admixing the slag component with the binder component forms a plurality of pelletized solid particles. Such pelletized particles may be agglomerated and have a highly porous structure, for example having an average surface area of greater than or equal to about 100 $cm^2/g$, optionally greater than or equal to about 500 $cm^2/g$; optionally greater than or equal to about 1,000 $cm^2/g$, and in some embodiments greater than 4,000 $cm^2/g$. Smaller particle sizes tend to have higher surface areas, which promotes reaction of the active ingredients. Such particle sizes and surface areas may be achieved by selecting the slag component and/or third component to have a smaller particle size than the desired agglomerate particle size and by controlling the relative amount of binder added to the slag component. Further processing of the admixed materials by milling or grinding, for example, may be done prior to or after admixing the slag and binder components (and optionally the third components) in a ball mill to reduce particle size.

In certain embodiments, the solid material comprises pelletized particles. A variety of different average particle size diameters are contemplated, for example, a plurality of particles having an average particle size diameter of about 0.25 mm to about 12 mm. The plurality of particles optionally has an average particle size diameter of about 0.25 mm to about 6 mm, optionally an average particle size diameter of about 0.5 mm to about 6 mm, optionally an average particle size diameter of about 1 mm to about 6 mm, optionally about 2 mm to about 6 mm. In alternate aspects, the average particle size diameter is about 6 mm to about 9 mm or about 9 mm to about 12 mm. The preferred particle size diameter is dependent upon the volume of the packed bed reactor, desired pressure drop through the reactor and residence time, and amount of pollutant reduction required. For example, one useful equation for calculating pressure drop across a packed bed in view of a particle diameter of the media is the Ergun Equation set forth in EQN. 2 below.

$$\frac{dP}{dL} = \frac{G}{\rho g_c D_p}\left(\frac{1-\Phi}{\Phi^3}\right)\left[\frac{150(1-\Phi)\mu}{D_p}\right] + 1.75G \qquad \text{(EQN. 2)}$$

$\frac{dP}{dL}$ is the pressure drop across the packed bed, L is the length of the packed bed(feet). Further $G=\rho v$, which is the superficial mass velocity in $lb_m/ft^2 \cdot hr$, where $\rho$ is the density of passing fluid and $v$ is the superficial velocity (the velocity that the fluid would have through an empty reactor at the same volumetric flow rate), found by volumetric fluid flow rate divided by the cross-sectional area. $\Phi$ is the porosity of the bed which is found by dividing the volume of the solid by the total bed volume. $g_c$ is the gravitational constant of $32.174\ lb_m \cdot ft/s^2 \cdot lb_f$ and $D_p$ is the equivalent average particle diameter of the solid packing material, and $\mu$ is the dynamic viscosity of the fluid passing through the bed in $lb_m/ft \cdot hr$.

In typical manufacturing facilities, effluent or exhaust streams from various processes have flow rates ranging from about 10,000 actual ft³/min (acfm) (about 285 m³/min) to about 3,000,000 acfm (about 85,000 m³/min). However, as appreciated by those of skill in the art, such flow rates vary based on the capacity of the facility and the type of process, and are difficult to generalize. For example, kiln exhaust from a typical cement manufacturing facility is usually between about 100,000 acfm (2,800 m³/min) to about 400,000 acfm (about 11,000 m³/min) and typical boiler exhaust flow rates can range from about 100,000 (2,800 m³/min) to about 600,000 acfm (17,000 m³/min). Thus, in certain embodiments, the packed bed reactor is capable of processing typical industrial exhaust gas flow rates and permitting contact with the solid material.

In certain embodiments, where a representative volumetric flow rate is about 41,000 acfm, an average particle size diameter of the solid particles is about 1 mm to about 6 mm. As such, a differential pressure from the inlet of the packed bed reactor to an outlet of the packed bed reactor is less than or equal to about 250 Pa.

In certain embodiments of the disclosure, the contacting of the solid particulate material occurs in a fluidized bed reactor, a venturi dry scrubber, a packed bed reactor, and/or any combinations or equivalents thereof. The listing of the above reactors is non-limiting, as other suitable reactors for effecting gas/solid reactions well known in the art are contemplated by the present disclosure. In certain embodiments, the effluent stream generated in a combustion source is introduced to a packed bed reactor containing a plurality of solid particles formed by admixing the slag component with the binder component.

Fluidized bed reactors suspend solid particles on upward-blowing jets of gas during the reaction process and are well known in the art. For example, atmospheric fluidized beds use a solid sorbent material to capture pollutants generated by fossil fuel combustion. In certain aspects, fluid should flow upward and have sufficient fluid velocity to lift the plurality of particles via friction forces. In this manner, a turbulent mixing of solids and gases is achieved.

In certain aspects of the disclosure, the effluent stream may comprise sufficient water via the combustion reaction, or water/steam can be added prior to the reactor in the effluent stream or in the solid material, if necessary, to enable reaction with a dry solid particulate material in a reactor. For example, representative water content in an effluent stream is generally less than or equal to about 3 wt. %, optionally less than or equal to about 0.5 wt. %. However, in certain alternate aspects, the effluent stream may pass through scrubbers or other equipment that may increase the water content of the effluent stream as it enters the reactor and may be much higher, to the point of saturation.

A packed bed reactor consists of a tower with a packed bed of media. Optionally, such beds may further have small objects or stages of material disposed therein. These spacing objects can be in the shape of saddles, rings, meshes or specialized shapes, that are designed to maximize contact between the solid particulate materials and the exhaust gas, while minimizing pressure drop and maintaining a desired porosity between the solid particles to reduce settling. Packed bed reactors typically operate at much lower pressure drops than other reactors, for example, a venturi scrubber reactor, and typically provide higher pollutant removal efficiency.

Figure 1:
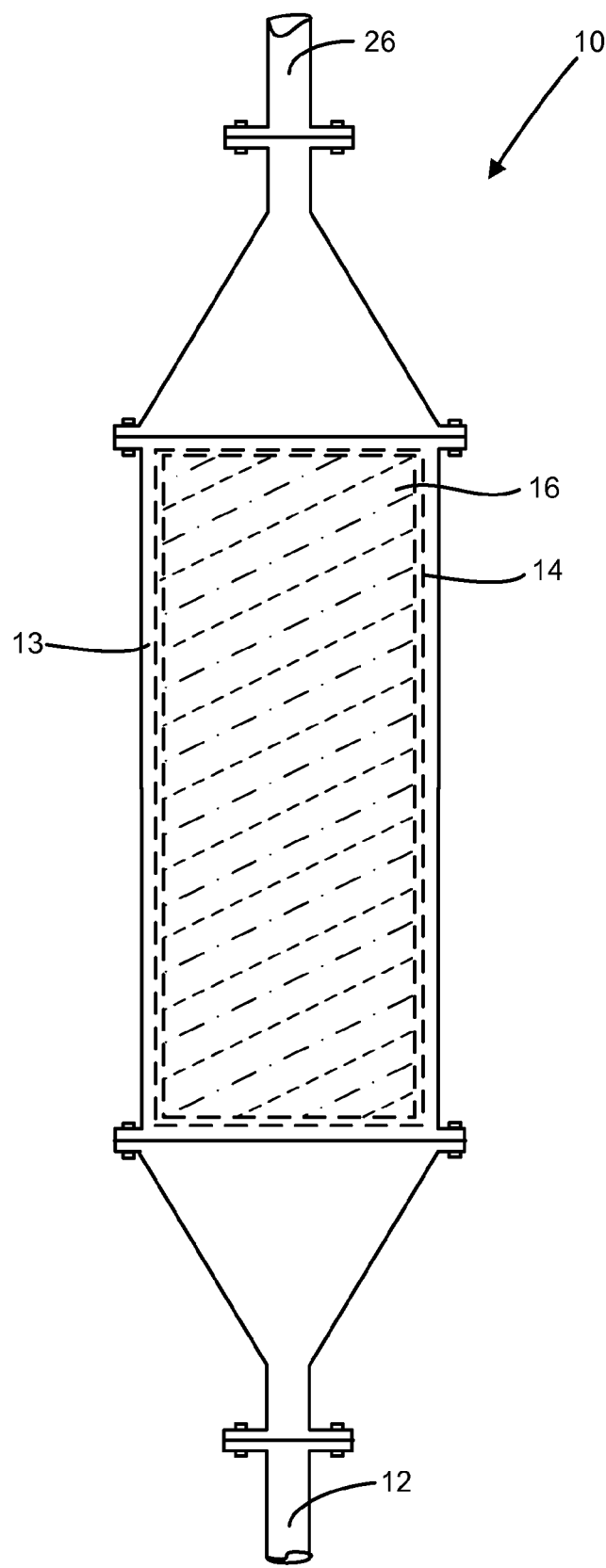
FIG. 1 is a schematic illustration of one embodiment of the present disclosure showing an emission abatement system with a packed bed reactor.
Figure 2:
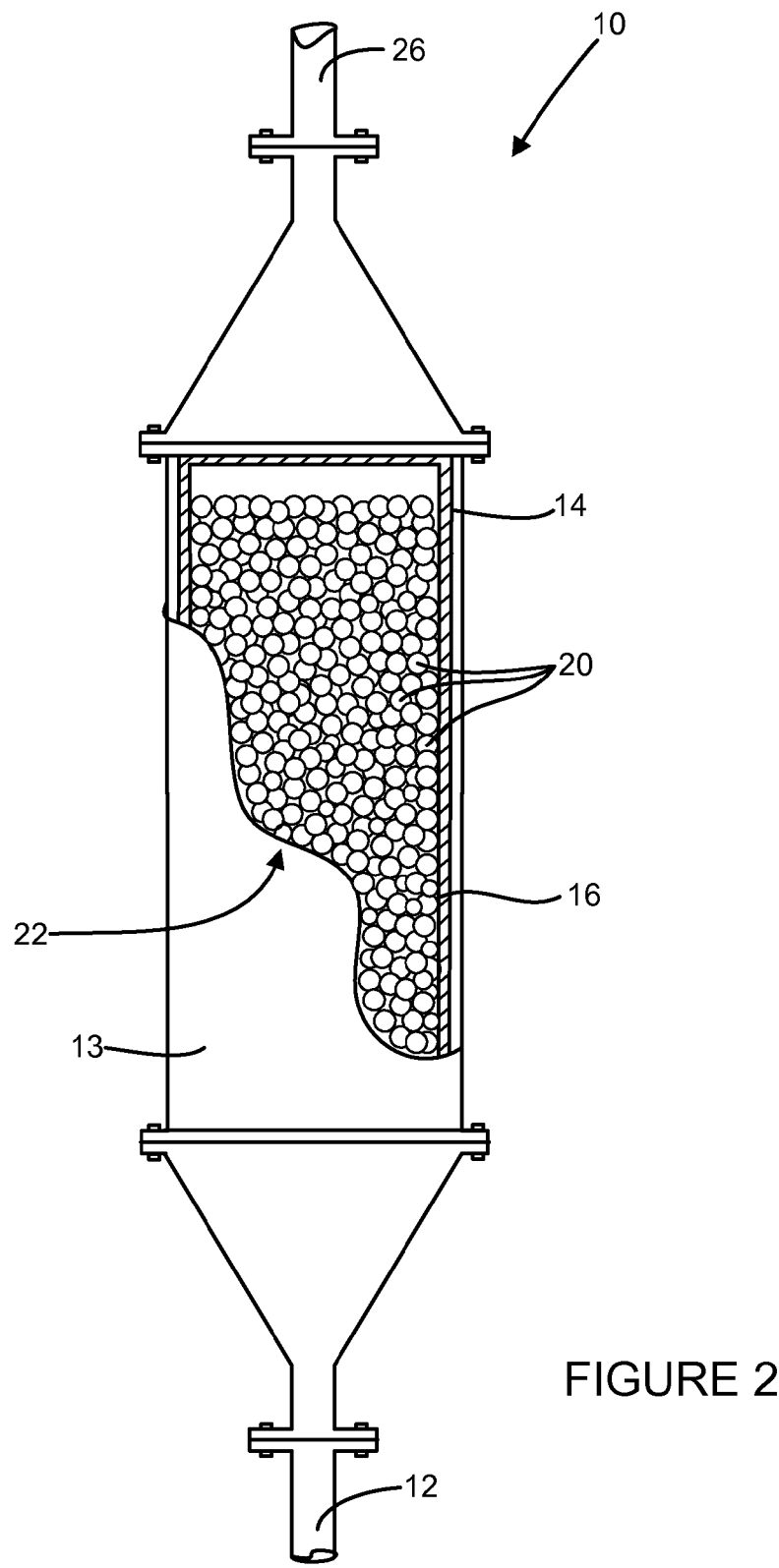
FIG. 2 is a schematic illustration of the embodiment shown in FIG. 1, showing a partial sectional view of the inner reactor chamber having a plurality of solid particles disposed in a bed.

A packed bed reactor is shown in FIGS. 1 and 2. The reactor tower 10 is typically designed so that, at maximum load, the average superficial gas velocity will not exceed the design gas velocity. For most packed bed reactors, the average gas velocity varies from about 8 to 25 ft/s (2.5 to 7 m/s) based upon outlet conditions, however the present disclosure is not limited to any particular velocities. The effluent/flue gas enters the packed bed reactor 10 from an inlet 12. The effluent fluid stream is generated upstream in a furnace, an incinerator, a boiler, or a kiln, and comprises at least one pollutant selected from sulfur oxides, nitrogen oxides, and carbon dioxide and preferably has water vapor present from the combustion reaction. The packed bed reactor 10 has an outer reactor chamber 13 which and an inner chamber 14 which contains a reactor bed 16 having a plurality of solid material particles 20 forming a packed media body 22 disposed therein. The plurality of solid material particles contain any of the material variations previously discussed above. The effluent fluid enters the reactor bed 16 and flows through the solid media body 22 contacting individual solid material particles 20, where a reaction occurs to adsorb and/or react with the desired pollutants in the effluent stream, thereby removing them from the passing gases. While not shown, a plurality of stages may be provided, each having solid material media thereon. After contact with the packed bed media body 22, the effluent stream exits the reactor at an exit 26. The design of the reactor 10 is influenced by the composition, porosity, and particle size of the solid media particles 20, the desired pollutant removal level, the temperature and pressure of the inlet gas (effluent fluid) as well as several other factors well known to those of skill in the art.

The operating pressures of typically vary between 1 psi (about 7 kPa) to about 100 psi (690 kPa), although the disclosure is not limited to such exemplary pressures. The volume of the reactor bed 16 permits several chemical and physical processes to approach completion. Gas/vapor-solid contacting in the towers permits high efficiency for pollutant removal and maximization of reagent utilization. In various aspects, it is desirable to minimize the differential pressure or pressure drop of the effluent fluid from the inlet 12 of the reactor 10 to the outlet 26 of the reactor 10. Representative differential pressures from the inlet 12 to the outlet 26 range are desirably less than or equal to about 250 Pa (1 inch water column).

While not shown, the reactor bed 16 of the inner chamber 14 may contain additional devices for effecting turbulence and retaining the positioning of the plurality of solid particles 20, for example baffles, porous structural materials, or saddle media which maintain positioning of the media bed, while promoting fluid distribution and turbulence through the packed bed reactor body 16 to enhance the opportunity for interface between the effluent gas 112 and the solid particles 20 within the reactor 10. Further, the inner chamber 14 and reactor bed 16 are sized, or have a volume sufficient to provide a residence time, that enables treatment of the effluent stream to reduce an amount of sulfur dioxide, nitrogen oxides, and/or carbon dioxide by preferably at least about 20%. A residence time generally refers to $$\tau = \frac{\text{reactor volume}}{\text{gas flow rate}},$$

indicating a mean time that a molecule is within a reactor 10. As such, in accordance with certain aspects of the disclosure, the inner chamber 14 is sized to have a volume that permits the effluent fluid to have a sufficient residence time to react with the solid particulate material 20 in the reactor bed 16 to achieve the desired removal of one or more pollutants. As appreciated by those of skill in the art, such volumes can be determined by the flow rate of effluent fluid to be treated. While not shown in FIG. 1 or 2, a recycle loop may be employed to reintroduce the effluent fluid exiting the reactor exit 26 back into the inlet 12 for additional pollutant removal.

In various other aspects, the disclosure provides methods of reducing sulfur oxides, nitrogen oxides, and/or carbon dioxide emissions from effluent streams generated by stationary combustion sources (e.g., boilers, incinerators), cement kilns, lime kilns, iron furnaces and steel furnaces. As described above, the methods of the present teachings may further remove one or more pollutants selected from the group: carbon monoxide, chlorofluorocarbons, hydrochloric acid, particulate matter, volatile organic compounds, aerosol compounds, mercury, lead, ammonia, and ozone. In this manner, various aspects of the disclosure provide an effective means for removing hazardous air pollution emissions, and thus controlling greenhouse gas emissions, while further recycling at least one industrial byproduct in a new use.

Figure 3:
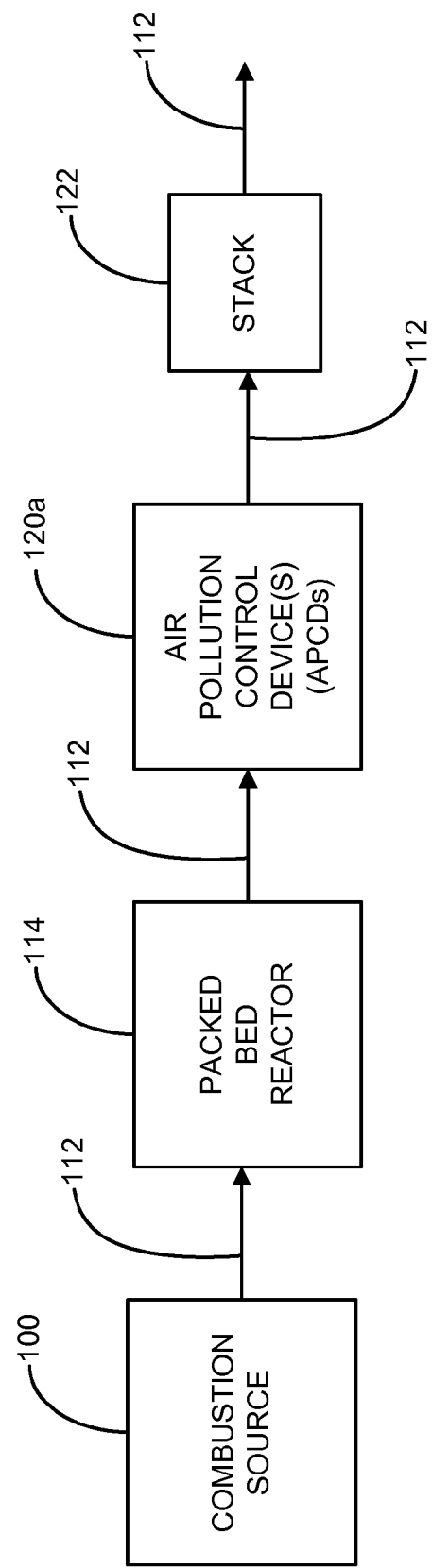
FIG. 3 is an exemplary process flow diagram for a method of reducing one or more hazardous air pollutants from a combustion source with a pollution abatement system according to certain embodiments of the disclosure, which is then treated by an air pollution control device.

FIGS. 3 and 4 depict alternate process flow diagrams of an air pollutant removal system in accordance with certain aspects of the disclosure. In FIG. 3, a combustion source 100 generates an effluent stream 112 having one or more air pollutants. The effluent stream 112 is introduced to a packed bed reactor 114 having a plurality of solid particles according to the principles of the present disclosure. Prior to contact with the solid material in the packed bed reactor 114, the fluid stream 112 can have a temperature of less than about 600° F. (approximately 316° C.). Such reactions, namely those occurring at less than about 600° F. (approximately 316° C.), are considered to be "low temperature." In some embodiments, the contacting occurs in an environment of less than or equal to about 450° F. (approximately 232° C.), optionally less than or equal to about 400° F. (approximately 204° C.), optionally less than or equal to about 350° F. (approximately 177° C.); optionally less than or equal to about 275° F. (approximately 135° C.), optionally less than or equal to about 250° F. (approximately 121° C.), optionally less than or equal to about 200° F. (approximately 93° C.), optionally less than or equal to about 150° F. (approximately 66° C.), optionally less than or equal to about 100° F. (approximately 38° C.), and in certain aspects at ambient temperatures in the range of reactor pressures discussed previously. In certain aspects, the contacting occurs at a temperature greater than or equal to about 275° F. (approximately 135° C.) and less than or equal to about 450° F. (approximately 232° C.), optionally greater than or equal to about 300° F. (approximately 149° C.) and less than or equal to about 350° F. (approximately 177° C.). In this regard, the effluent stream 112 can be cooled, for example by a heat exchanger, prior to contacting the solid particulate material. Alternatively, the reactor can be located far downstream of the combustion in a low temperature zone of the system. The teachings of the present disclosure are particularly advantageous for effective removal of significant quantities of sulfur oxides, nitrogen oxides, and/or carbon dioxide at such low temperatures.

Thus, in various aspects, the present disclosure provides methods of reducing pollution generated by the combustion source 100 by reducing an initial amount of sulfur oxides present in a fluid stream 112 exiting the combustion source 100 by contacting the fluid stream 112 at low temperatures with a solid material formed by admixing a slag component having one or more reactive silicate compounds with a binder component, as described above. In other aspects, the methods of the present disclosure provide reducing an initial amount of nitrogen oxides present in a fluid stream exiting the combustion source 100 by contacting the fluid stream 112 at low temperatures with a solid material formed by admixing a slag component having one or more reactive silicate compounds with a binder component. In certain aspects, an initial amount of one or more air pollutants selected from the group consisting of sulfur oxides, nitrogen oxides, and carbon dioxide present in the fluid stream 112 are removed by contact with the solid materials of the present disclosure at low temperatures.

Thus, the treated effluent exits the reactor 114 having a reduced amount of sulfur oxides, nitrogen oxides, and/carbon dioxide as compared to an initial amount of sulfur oxides, nitrogen oxides, and/or carbon dioxide present in the untreated effluent stream 112. In certain aspects, the removal efficiency of the reactor 114 is greater than or equal to about 20%, optionally greater than or equal to about 25%, optionally greater than or equal to about 30%, optionally greater than or equal to about 35%. Removal efficiency can be calculated by the following equation:

$$RE(\%) = 100\left(1 - \frac{E_o}{E_i}\right) \quad \text{(EQN. 3)}$$

Where removal efficiency (RE) is a percentage of pollutant removed from the effluent stream and where $E_i$ is the average amount of pollutant present in the effluent stream (mass flow rate as measured prior to the inlet of the reactor) and $E_o$ is the average amount of pollutant present in the effluent stream after exiting the reactor (mass flow rate as measured exiting the reactor).

The amount of sulfur oxides removed from the fluid stream after contact with the solid material in the reactor bed corresponds to a removal efficiency of optionally greater than or equal to about 20%, optionally greater than or equal to about 25%, optionally greater than or equal to about 30%, optionally greater than or equal to about 40%, optionally greater than or equal to about 50%, optionally greater than or equal to about 60%, optionally greater than or equal to about 70%, optionally greater than or equal to about 75%, optionally greater than or equal to about 80%, optionally greater than or equal to about 85%, optionally greater than or equal to about 90%, optionally greater than or equal to about 95% by weight. The removal efficiency reflects the reduction of the sulfur oxides after contacting in the effluent fluid stream, as compared to an initial amount of sulfur oxides present in the fluid stream prior to contacting. The removal efficiencies described herein may be determined as an average over an interval of time, for example, an average removal efficiency over a minute, ten minutes, a half-hour or an hour, for example. In certain aspects, the removal efficiency of sulfur oxides is optimized to be greater than 75%; optionally greater than 80%; optionally greater than 85%, and in some embodiments greater than 90%. Recycling of the stream exiting the reactor by reintroducing the stream to the inlet of the reactor, as discussed above, where the recycled stream is further treated, removes additional pollutants and provides higher removal efficiency for each of the air pollutants discussed herein.

The amount of nitrogen oxides removed from the fluid stream after contact with the solid material in the reactor bed is reflected by a removal efficiency of greater than or equal to about 10%, optionally greater than or equal to about 15%, optionally greater than or equal to about 20%, optionally greater than or equal to about 25%, optionally greater than or equal to about 30%, optionally greater than or equal to about 40%, optionally greater than or equal to about 50%, optionally greater than or equal to about 60%, optionally greater than or equal to about 75%. In certain aspects, the removal efficiency of nitrogen oxides is optimized to be greater than or equal to about 20%, optionally greater than or equal to about 25%.

The amount of carbon dioxide removed from the fluid stream after contact with the solid material in the reactor bed is reflected by a removal efficiency of greater than or equal to about 10%, optionally greater than or equal to about 15%, optionally greater than or equal to about 20%, optionally greater than or equal to about 25%, optionally greater than or equal to about 30%, optionally greater than or equal to about 35%, optionally greater than or equal to about 40%, optionally greater than or equal to about 50%, optionally greater than or equal to about 60%, optionally greater than or equal to about 75%. Moreover, in various aspects, such methods are conducted at low temperatures, where the fluid stream has a temperature of less than about 600° F. (about 316° C.).

Further, in accordance with various aspects of the present disclosure, a plurality of pollutants is concurrently removed from the effluent stream. For example, a total cumulative amount of sulfur dioxides, nitrogen oxides, and carbon dioxide in the effluent stream is reduced after contacting the solid materials in the packed bed reactor to a removal efficiency of greater than or equal to about 20%, optionally greater than or equal to about 25%, optionally greater than or equal to about 30%, optionally greater than or equal to about 35%, and in some aspects, greater than or equal to about 40% removal efficiency of the total amount of sulfur oxides, nitrogen oxides, and carbon dioxide. Thus, in certain aspects, the removal efficiency is greater than or equal to about 20% on an hourly basis of the total cumulative amount of sulfur dioxides, nitrogen oxides, and carbon dioxide initially present in the effluent stream.

Thus, in certain aspects, a concentration of one or more pollutants in the effluent stream exiting the reactor of the present disclosure is monitored. Such monitoring is well known to those of skill in the art and may include continuous emission monitoring systems (CEMs) which provide an average concentration of target pollutants in the effluent stream over a predetermined interval, for example, grams per minute. If a predetermined removal efficiency is determined for a pollutant, the monitoring of the concentration of the target pollutant in the effluent stream will indicate when the solid material media is spent and should be replaced with fresh media. A predetermined removal efficiency can thus be used in a control system and can be determined by empirical observation of the system and/or by calculations modeling the system. If the concentration of sulfur oxides, nitrogen oxides, and/or carbon dioxide exceeds a predetermined set point, the solid particulate material media is then removed via disposal. In certain aspects, the reactor may be taken offline and the solid material media may be replaced with fresh media and then brought back online.

After the reaction of carbon dioxide and/or sulfur dioxide with the solid particulate material, a spent solid material product comprising calcium carbonate and/or calcium sulfate is generated. In certain aspects, the spent solid material can be regenerated and reused in the reactor. In one aspect, the surface of the agglomerated solid material particles can be removed by surface grinding and screening. The material removed from the surface includes calcium carbonate and/or calcium sulfate. In this manner, the spent surface is regenerated for additional reaction with the pollutant(s) in the effluent fluid stream and the solid material can be reused in the reactor bed. In another aspect, the agglomerated solid material pellets can be ground, for example in a mill, and then mixed with new binder component to reform solid material pellets. The surfaces of the solid materials are thus regenerated and can be reused. The spent solid particulate material (having calcium carbonate and/or calcium sulfate) is optionally used as a raw material for another industrial process, such as a raw material in cement manufacturing or flux in an iron and/or steel manufacturing process, due to the presence of calcium carbonate and/or calcium sulfate.

In other aspects, the reactor 200 is capable of continuous use and may have at least two distinct operating inner chambers 202, as shown in FIG. 5. During operation, only one of the two reaction chambers (204) is active and a bypass valve 208 diverts effluent flow away from the other chamber (206) which is inactive. The solid material 210 in the inactive chamber 206 can be replaced, thus providing continuous uninterrupted operation of the pollution removal system. The plurality of solid particles of the solid media bed may be directly charged into the reactor bed, with optional spacing devices as desired, or alternately may be provided in replaceable cartridges that can be placed within the inner reactor chamber. Thus, in certain embodiments, the pollutant sequestration system is continuous and regenerative.

Thus, in various aspects, the disclosure provides a pollution abatement system comprising a combustion source that generates an effluent stream having at least one air pollutant selected from the group consisting of: sulfur oxides, nitrogen oxides, and carbon dioxide, which is present in the effluent stream at an initial amount. The system includes a packed bed reactor having an inlet for receiving the effluent stream and an outlet. The reactor has at least one chamber comprising a plurality of solid particles having an average particle diameter size of about 0.25 mm to about 12 mm. The solid particles are formed by admixing a slag component having one or more reactive silicate compounds with a binder component. The chamber has a volume to provide a sufficient residence time to reduce an amount of the air pollutant by a removal efficiency of at least about 20% relative to the initial amount.

As discussed above, it is believed that the active compounds are reactive silicates. Further, while not limiting the teachings to any particular theory, in certain aspects, calcium oxide may also play a role in the reaction with one or more pollutants ($SO_X$, $NO_X$, and/or $CO_2$) in the effluent stream. While not limiting as to the present teachings, it is believed that the solid particulate material undergoes the following reaction mechanisms with respect to carbon dioxide. The water vapor present in the combustion source effluent and carbon dioxide form carbonate anions in a basic pH environment. The carbonate anions react with calcium ions in the presence of reactive silicates to form calcium carbonate. Basicity of the environment is believed to promote reaction of the carbon dioxide with the calcium oxide and silicates, and further is believed to favor formation of reactive silicate products in the spent solid materials. The spent solid material still contains reactive silicates and desirably high alkali metal ions, which help to maintain the pH. It is believed that the carbonation reaction reduces the pH (to more neutral conditions) of the solid material, thus the alkalinity of the optional third component may be desirable for regulating pH.

With renewed reference to FIGS. 3 and 4, one or more air pollution control devices 120 (APCDs) further treat the effluent stream 112 after it has exited the reactor 114. As appreciated by those of skill in the art, the effluent stream comprises one or more additional pollutants other than $SO_X$, $NO_X$, and/or $CO_2$. For example, in addition to $SO_X$, $NO_X$, and/or $CO_2$, common air pollutants found in effluent streams from boilers, kilns, furnaces, and incinerators include carbon monoxide, hydrochloric acid, chlorofluorocarbons, particulate matter, volatile organic compounds, aerosol compounds, mercury, lead, ammonia, ozone, and combinations and equivalents thereof. Thus, in some embodiments, the reactor 114 may serve to incidentally remove a portion of these other pollutants, however, it is contemplated that additional downstream APCDs (120a of FIG. 3) may be required to reduce the one or more additional pollutants to acceptable concentrations. Typical exemplary APCDs 120 include electrostatic precipitators, baghouse filters, cyclones, activated carbon scrubbers, flue gas desulfurization scrubbers, thermal oxidizers, pressure swing adsorbers, selective catalytic reactors, selective non-catalytic reactors, and the like.

In certain embodiments, such as those shown in FIG. 4, the pollution removal system further comprises one or more air pollution control devices 120a, 120b (APCDs) to pre-treat the effluent stream 112 prior to entering the reactor 114. Thus, any additional pollutants can be removed that may cause adverse or undesirable reactions with the solid particulate material or corrosion or damage to the equipment hardware. After treatment by the reactor 114 and APCDs (120a and/or 120b), the effluent stream 112 is directed to a stack 122, which vents to the atmosphere.

In certain aspects, the present disclosure provides a method of reducing $SO_X$, $NO_X$, and $CO_2$ emissions from a cement manufacturing facility. The method comprises reacting cement manufacturing raw materials (containing sources of calcium, silicon, aluminum, and iron) in a kiln to produce clinker and an effluent stream comprising $SO_X$, $NO_X$, and $CO_2$. At least a portion of the effluent stream is contacted with a solid particulate material such as those described in previous embodiments above. A product is generated that comprises calcium carbonate and/or calcium sulfate. Any of the processes of the embodiments described above may be useful for the present embodiments. For example, prior to the contacting the effluent with scrubbing material, the effluent stream can be processed in one or more air pollution control devices (APCDs) to remove one or more air pollutants. Limestone (i.e., calcium carbonate) is a raw material used in the manufacture of lime and cement. Similarly, gypsum (i.e., calcium sulfate) is ground with Portland cement clinker to form Portland cement. In certain embodiments, the product comprising calcium carbonate or calcium sulfate is beneficially re-used as a raw material to produce clinker and/or lime. Thus, in cement manufacturing, the generated calcium carbonate is subsequently combined with the raw materials to produce the clinker or calcium sulfate with clinker to produce cement.

The methods of the present disclosure can reduce $SO_X$, $NO_X$, and $CO_2$ emissions from a cement and/or lime manufacturing facility, from an iron and/or steel manufacturing facility. The method comprises contacting a solid particulate material with at least a portion of an effluent stream comprising $SO_X$, $NO_X$, and $CO_2$ that is generated in a furnace of an iron and/or steel manufacturing process. The furnace can be any of those described above in the context of the slag sources, such as a blast furnace (iron ore processing), an open hearth furnace (steel processing), a basic oxygen process furnace (steel processing), or an electric arc furnace (steel processing). The solid particulate material comprises a binder component, a slag component distinct from the binder component. A product comprising calcium carbonate is generated that is capable of reuse as a raw material in an industrial process. In certain embodiments, the slag component comprises a slag generated in the iron and/or steel manufacturing process.

In yet other embodiments, methods of reducing $SO_X$, $NO_X$, and $CO_2$ emissions from a hydrocarbon combustion source, such as a power plant boiler or an incinerator, are provided. A hydrocarbon combustion source comprises all stationary point sources that combust hydrocarbons that form $SO_X$, $NO_X$, and $CO_2$, including those facilities that burn fossil-fuels (e.g., coal, methane), synthetic fuels (e.g., petroleum coke, syngas, ethanol), or any other variety of hydrocarbons. The process comprises contacting a solid particulate material with at least a portion of an effluent stream comprising $SO_X$, $NO_C$, and $CO_2$ that is generated by combustion of a fossil-fuel. The solid particulate material is any of those described above. A product comprising calcium carbonate and/or calcium sulfate that is capable of reuse as a raw material in an industrial process is thus generated. The invention has been described with respect to various preferred embodiments. Further non-limiting embodiments are given in the Examples that follow.

EXAMPLE I

A solid pelletized material is formed by mixing 10% by weight of Type III (chemically and physically similar to Type I cement except ground finer to produce higher early strengths ranging from 320 to 670 $m^2/g$ Blaine fineness, generally greater than about 450 $m^2/g$ Blaine fineness) weight Portland cement with 90% stainless steel slag in a mixer. 30% water is added to the mixture (on a wet basis 63% slag and 7% Portland cement) until pelletized particles are formed having an average particle diameter of about 2 to 6 mm. The solid particles are placed in a packed bed reactor having a reactor bed divided into three stages. The reactor is 8 inches (about 20 cm) in diameter and has a length of about 3 feet (91 cm). The three-stage reactor bed is filled to a height of about 2.5 feet (about 76 cm). A coal-burning furnace is operated to generate an effluent having a flow rate of about 41,000 cubic feet per minute and containing sulfur oxides ($SO_X$), nitrogen oxides ($NO_X$), and carbon dioxide. The temperature of the effluent as it enters the packed bed reactor inlet is about 323° F. (about 162° C.). In the effluent stream exiting the reactor, the sulfur oxide concentration is reduced by about 85% by weight as compared with the inlet (e.g., for every 100 g entering the reactor, only 15 g of sulfur oxides are in the exiting gas stream), the nitrogen oxides are reduced by about 25%, and the carbon dioxide is reduced by about 31%.

In various embodiments, the present disclosure provides methods of recycling industrial byproducts which would otherwise be stockpiled, land-filled, or discarded. For example, in certain embodiments, a method of recycling industrial byproducts is provided. A solid particulate material is formed by admixing a first manufactured component with a second manufactured component. The first manufactured component is a slag component having one or more reactive silicate compounds. The second manufactured component is a binder component formed as a waste stream, for example, molasses. An effluent stream generated in an industrial process comprising $SO_X$, $NO_X$, and $CO_2$ is then contacted with the solid material. A product comprising calcium carbonate and/or calcium sulfate is generated that is capable of beneficial reuse such as in an industrial process. In some embodiments, after the contacting and after the generating, the solid particulate material is spent and at least a portion of the spent solid particulate material is capable of recycling in an industrial manufacturing process.

In this manner, the methods of the disclosure provide further sustainable development initiatives, which include balancing the need for current growth and development against the need to protect the natural and manmade environment for future generations. Further, the methods and systems of the disclosure provide reduced sulfur oxides, nitrogen oxides, and/or carbon dioxide emissions for various stationary point sources at low temperatures, which in addition to reducing greenhouse gas emissions, provides the ability for such point sources to comply with various regulations, to receive an economic and commercial benefit through carbon dioxide emission credit trading programs, and to reduce potential corrosion and inefficiencies attendant with the presence of sulfur oxides, nitrogen oxides, and/or carbon dioxide in effluent streams.

The full disclosures of International Application PCT/US2007/005976 filed on Mar. 8, 2007 which claims the benefit of U.S. Provisional Patent Application No. 60/782,325 filed on Mar. 10, 2006 are each hereby incorporated by reference in their respective entireties.

What is claimed is:

1. A pollution abatement system comprising:
a packed bed reactor having an inlet for receiving an effluent stream generated in a combustion source comprising sulfur oxides and carbon dioxide respectively present in the effluent stream at an initial amount and an outlet, the reactor having at least one chamber comprising a plurality of solid particles having an average particle diameter size of about 0.25 mm to about 12 mm, wherein the solid particles comprise a slag component having a silicon dioxide content of greater than or equal to about 25% by weight and having one or more reactive silicate compounds and a binder component, wherein the chamber has a volume corresponding to a sufficient residence time so as to provide a removal efficiency for sulfur oxides of greater than or equal to about 70% as compared to the initial amount of sulfur oxides present in the effluent stream and a removal efficiency for carbon dioxide of greater than or equal to about 20% as compared to an initial amount of carbon dioxide present in the effluent stream.

2. The pollution abatement system of claim 1, wherein the packed bed reactor comprises two or more chambers, wherein during operation one of the two chambers is an active chamber that receives the effluent stream and another of the two chambers is an inactive chamber, wherein the effluent stream is passed through the active chamber during operation, and the inactive chamber accepts a replaceable cartridge containing the plurality of solid particles.

3. The pollution abatement system of claim 1, wherein the at least one chamber of the packed bed reactor through which the effluent stream passes is divided into at least two stages, wherein each of the stages comprises a portion of the plurality of solid particles.

4. The pollution abatement system of claim 1, wherein the effluent stream has a flow rate of greater than or equal to about 10,000 actual ft³/min (about 285 m³/min) to less than or equal to about 3,000,000 actual ft³/min (about 85,000 m³/min).

5. The pollution abatement system of claim 1, wherein a temperature of the effluent stream is less than or equal to about 600° F. (about 316° C.) and the packed bed reactor has a differential pressure of less than or equal to about 250 Pa as measured from the inlet to the outlet of the packed bed reactor.

6. The pollution abatement system of claim 5, wherein the temperature is greater than or equal to about 275° F. (about 135° C.) and less than or equal to about 450° F. (about 232° C.).

7. The pollution abatement system of claim 1, further comprising one or more air pollution control devices (APCDs) in fluid communication with either the inlet or the outlet of the packed bed reactor, wherein the one or more APCDs process the effluent fluid stream prior to entering the reactor and/or after exiting the packed bed reactor.

8. The pollution abatement system of claim 1, further comprising a continuous emission monitoring system for monitoring the amount of the sulfur oxides, carbon dioxide, or both sulfur oxides and carbon dioxide in the effluent stream prior to entering or after exiting the packed bed reactor.

9. The pollution abatement system of claim 1, wherein the binder component comprises one or more materials selected from the group consisting of: Portland cement, cement clinker, molasses, guar gum, starch, and combinations thereof, and the slag component comprises one or more materials selected from the group consisting of: carbon slag, air cooled blast furnace slag, granulated blast furnace slag, ground granulated blast furnace slag, expanded and/or pelletized blast furnace slag, basic oxygen furnace steel slag, open hearth furnace steel slag, electric arc furnace steel slag, and combinations thereof.

10. The pollution abatement system of claim 1, wherein the slag component comprises stainless steel slag and the binder component comprises Portland cement and/or cement clinker.

11. The pollution abatement system of claim 1, wherein the solid particles further comprise a third component comprising a source of calcium oxide and a source of alkali metal ions comprising free lime (free CaO) at greater than or equal to about 3% by weight and $Na_2O$, $K_2O$, or combinations thereof at greater than or equal to 1% by weight.

12. The pollution abatement system of claim 1, wherein a ratio of the slag component to the binder component in the solid particles is about 6:1 to about 99:1 on a dry basis.

13. The pollution abatement system of claim 1, further comprising a recycle loop that returns at least a portion of the effluent stream exiting the packed bed reactor to the inlet of the packed bed reactor.

14. The pollution abatement system of claim 1, wherein the packed bed reactor further reduces an amount of at least one additional pollutant present in the effluent stream selected from the group consisting of: carbon monoxide, nitrogen oxides, chlorofluorocarbons, hydrochloric acid, particulate matter, volatile organic compounds, aerosol compounds, mercury, lead, ammonia, ozone, and combinations thereof.

15. The pollution abatement system of claim 1, wherein the removal efficiency of the packed bed reactor for sulfur oxides is greater than or equal to about 80% from the effluent stream and the removal efficiency for carbon dioxide of the packed bed reactor is greater than or equal to about 30% from the effluent stream.

16. The pollution abatement system of claim 1, wherein the combustion source is selected from the group consisting of: a boiler, an incinerator, a cement kiln, a lime kiln, an iron furnace, a steel furnace, and combinations thereof.

17. A pollution abatement reactor comprising:
an inlet for receiving an effluent stream comprising sulfur oxides and carbon dioxide generated in a combustion source, wherein the sulfur oxides and the carbon dioxide are respectively present in the effluent stream at an initial amount;
an outlet;
at least one chamber comprising a plurality of solid particles comprising a slag component and a binder component, the slag component having silicon dioxide at greater than or equal to about 25% by weight and one or more reactive silicate compounds, wherein the chamber has a volume with a sufficient residence time to provide a removal efficiency for the sulfur oxides of greater than or equal to about 70% as compared to the initial amount of sulfur oxides in the effluent stream and a removal efficiency for carbon dioxide of greater than or equal to about 20% as compared to the initial amount of carbon dioxide in the effluent stream.

18. The pollution abatement reactor of claim 17, wherein the reactor is selected from the group consisting of: a fluidized bed reactor, a venturi dry scrubber, a packed bed reactor, and combinations thereof.

19. The pollution abatement reactor of claim 17, wherein the removal efficiency of the reactor for sulfur oxides is greater than or equal to about 80% and the removal efficiency for carbon dioxide of the reactor is greater than or equal to about 30%.

20. The pollution abatement reactor of claim 17, wherein the effluent stream has a flow rate of greater than or equal to about 10,000 actual ft$^3$/min (about 285 m$^3$/min) to less than or equal to about 3,000,000 actual ft$^3$/min (about 85,000 m$^3$/min).

21. The pollution abatement reactor of claim 17, wherein the slag component comprises stainless steel slag and the binder component comprises Portland cement and/or cement clinker.

22. The pollution abatement reactor of claim 17, wherein the solid particles further comprise a third component comprising a source of calcium oxide and a source of alkali metal ions comprising free lime (free CaO) at greater than or equal to about 3% by weight and Na$_2$O, K$_2$O, or combinations thereof at greater than or equal to 1% by weight.

23. A pollution abatement system comprising:
a packed bed reactor having an inlet for receiving an effluent stream comprising sulfur oxides and carbon dioxide generated in a combustion source, wherein the sulfur oxides and the carbon dioxide are respectively present in the effluent stream at an initial amount, the reactor further having an outlet and at least one chamber comprising a plurality of solid particles comprising a slag component and a binder component, the slag component having silicon dioxide at greater than or equal to about 25% by weight and one or more reactive silicate compounds, wherein the chamber has a volume corresponding to a sufficient residence time to provide a removal efficiency for sulfur oxides of greater than or equal to about 80% as compared to the initial amount of sulfur oxides present in the effluent stream and a removal efficiency for carbon dioxide of greater than or equal to about 30% as compared to an initial amount of carbon dioxide present in the effluent stream.

24. The pollution abatement system of claim 23, wherein the slag component comprises stainless steel slag and the binder component comprises Portland cement and/or cement clinker.

25. The pollution abatement system of claim 23, wherein the packed bed reactor further reduces an amount of at least one additional pollutant present in the effluent stream to a removal efficiency of greater than or equal to about 20% as compared to the initial amount of the at least one additional pollutant, wherein the at least one additional pollutant is selected from the group consisting of: carbon monoxide, nitrogen oxides, chlorofluorocarbons, hydrochloric acid, particulate matter, volatile organic compounds, aerosol compounds, mercury, lead, ammonia, ozone, and combinations thereof.

* * * * *

UNITED STATES PATENT AND TRADEMARK OFFICE
CERTIFICATE OF CORRECTION

PATENT NO. : 8,246,727 B2
APPLICATION NO. : 13/174492
DATED : August 21, 2012
INVENTOR(S) : Douglas C. Comrie Page 1 of 1

It is certified that error appears in the above-identified patent and that said Letters Patent is hereby corrected as shown below:

Col. 5, line 5, replace "(2CaO.SiO2" with --(2 CaO·SiO$_2$--

Col. 5, lines 6-7, replace "(3CaO.SiO$_2$" with --(3 CaO·SiO$_2$--

Col. 5, line 38, replace "(CaCO$_3$.MgCO$_3$)" with --(CaCO$_3$·MgCO$_3$)--

Col. 9, line 65, replace "2CaO.SiO$_2$)" with --2CaO·SiO$_2$)--

Col. 9, line 66, replace "3CaO.SiO$_2$)" with --3CaO·SiO$_2$)--

Col. 9, line 67, replace "3CaO.Al$_2$O$_3$)" with --3CaO·Al$_2$O$_3$)--

Col. 10, line 1, replace "4CaO.Al$_2$O$_3$.Fe$_2$O$_3$)" with --4CaO·Al$_2$O$_3$·Fe$_2$O$_3$)--

Col. 13, line 56, after "weight" insert a --.--

Col. 15, line 20, replace "(CaCO$_3$.MgCO$_3$)" with --(CaCO$_3$·MgCO$_3$)--

Col. 16, line 32, replace "is" with --at--

Col. 18, line 60, after "pressures" delete "of"

Col. 20, line 41, replace "and/carbon" with --and carbon--

Col. 24, line 38, replace "NO$_c$" with --NOx--

Signed and Sealed this
Twenty-seventh Day of November, 2012

David J. Kappos
*Director of the United States Patent and Trademark Office*